(12) United States Patent
Howarth et al.

(10) Patent No.: US 7,212,482 B2
(45) Date of Patent: May 1, 2007

(54) APPARATUS AND METHOD TO DYNAMICALLY ADJUST THE AMPLITUDE OF A SIGNAL COMPRISING INFORMATION

(75) Inventors: James J. Howarth, Tucson, AZ (US); Robert A. Hutchins, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 10/306,989

(22) Filed: Nov. 29, 2002

(65) Prior Publication Data

US 2004/0105514 A1    Jun. 3, 2004

(51) Int. Cl.
    *G11B 7/00* (2006.01)
(52) U.S. Cl. .............................. 369/59.15; 369/124.1; 369/47.25; 369/47.27
(58) Field of Classification Search ............. 369/59.15, 369/124.1, 124.12, 44.29, 44.35, 44.36, 47.25, 369/47.27
    See application file for complete search history.

(56) References Cited

U.S. PATENT DOCUMENTS

| | | | |
|---|---|---|---|
| 4,750,058 A | 6/1988 | Hirt et al. ..................... 360/46 |
| 5,347,501 A * | 9/1994 | Iimura ..................... 369/44.25 |
| 5,719,843 A | 2/1998 | Nakajima et al. ............. 369/59 |
| 5,844,738 A | 12/1998 | Behrens et al. ............... 360/44 |
| 6,169,639 B1 | 1/2001 | Salo et al. ..................... 360/46 |
| 6,282,042 B1 * | 8/2001 | Hana et al. .................... 360/64 |
| 6,961,292 B2 * | 11/2005 | Ma et al. ................. 369/44.28 |
| 2002/0196717 A1 * | 12/2002 | Masui et al. ............. 369/44.29 |

FOREIGN PATENT DOCUMENTS

JP                07014196 A   *   1/1995

* cited by examiner

*Primary Examiner*—Wayne Young
*Assistant Examiner*—Linh T. Nguyen
(74) *Attorney, Agent, or Firm*—Dale F. Regelman; Chandler & Udall, LLP

(57) ABSTRACT

A method and apparatus to dynamically adjust the amplitude of a signal comprising information read from an information storage medium. The method first forms (N) digital signals comprising information read from an information storage medium. The method provides a first signal comprising information read an information storage medium, wherein that first signal is one of the (N) digital signals. The method provides a first gain level, and calculates a first gain adjusted signal comprising the multiplication product of the first signal and the first gain level. To dynamically adjust that gain level, Applicants' method determines a gain error. Using that gain error, Applicants' method then calculates a second gain level by multiplying the gain error times a multiplier coefficient, and adding that multiplication product to the first gain level.

27 Claims, 17 Drawing Sheets

FIG. 2

| HEAD TRACK NO. | HEAD MODULE | |
|---|---|---|
| | L | R |
| 1 | WR | RD |
| 2 | RD | WR |
| 3 | WR | RD |
| 4 | RD | WR |
| 5 | WR | RD |
| 6 | RD | WR |
| 7 | WR | RD |
| 8 | RD | WR |
| SERVO | LS1 | RS1 |
| SERVO | LS2 | RS2 |
| 9 | WR | RD |
| 10 | RD | WR |
| 11 | WR | RD |
| 12 | RD | WR |
| 13 | WR | RD |
| 14 | RD | WR |
| 15 | WR | RD |
| 16 | RD | WR |
| SERVO | LS3 | RS3 |
| SERVO | LS4 | RS4 |
| 17 | WR | RD |
| 18 | RD | WR |
| 19 | WR | RD |
| 20 | RD | WR |
| 21 | WR | RD |
| 22 | RD | WR |
| 23 | WR | RD |
| 24 | RD | WR |
| SERVO | LS5 | RS5 |
| SERVO | LS6 | RS6 |
| 25 | WR | RD |
| 26 | RD | WR |
| 27 | WR | RD |
| 28 | RD | WR |
| 29 | WR | RD |
| 30 | RD | WR |
| 31 | WR | RD |
| 32 | RD | WR |

201: tracks 1-8
211: SERVO LS1/RS1, LS2/RS2
221: tracks 9-16
231: SERVO LS3/RS3, LS4/RS4
241: tracks 17-24
251: SERVO LS5/RS5, LS6/RS6
261: tracks 25-32
200

APPARATUS AND METHOD TO DYNAMICALLY ADJUST THE AMPLITUDE OF A SIGNAL COMPRISING INFORMATION

FIELD OF THE INVENTION

Applicant's invention relates to an apparatus and method to dynamically adjust the amplitude of a digital signal comprising information read from an information storage medium.

BACKGROUND OF THE INVENTION

Automated media storage libraries are known for providing cost effective access to large quantities of stored media. Generally, media storage libraries include a large number of storage slots on which are stored portable data storage media. The typical portable data storage media is a tape cartridge, an optical cartridge, a disk cartridge, electronic storage media, and the like. By "electronic storage media," Applicants mean a device such as a PROM, EPROM, EEPROM, Flash PROM, compactflash, smartmedia, and the like.

One (or more) accessors typically accesses the data storage media from the storage slots and delivers the accessed media to a data storage device for reading and/or writing data on the accessed media. Suitable electronics operate the accessor(s) and operate the data storage device(s) to provide information to, and/or to receive information from, an attached on-line host computer system.

Removeable media, whether magnetic, optical, or electronic, are subject to variability. Such variability includes, for example, inconsistencies between manufacturers of that media. In addition certain magnetic/optical media comprise encoded information using pulse position modulation. Other magnetic/optical media, comprise encoded information using pulse width modulation. Some media comprise information encoded using both pulse position modulation and pulse width modulation. In addition, such variability arises from modernization of the media.

In order to minimize the effects of such media variability, what is needed is an apparatus and method to dynamically adjust the amplitudes of the digital signals provided to a detector, where those digital signals comprise information read from an information storage medium.

SUMMARY OF THE INVENTION

Applicants' invention comprises a method and apparatus to dynamically adjust the amplitude of a signal comprising information read from an information storage medium. Applicants' method first forms (N) digital signals comprising information read from an information storage medium, wherein each of those (N) digital signals comprises an amplitude. Applicants' method then determines if a first signal comprises information read from a calibration region of the information storage medium, wherein that first signal is one of the (N) digital signals.

If the first signal comprises information read from a calibration region of the information storage medium, then Applicants' method provides a first acquisition gain level and an acquisition multiplier coefficient, and calculates a first gain adjusted signal comprising the multiplication product of the first signal and the first acquisition gain level. To dynamically adjust that acquisition gain level, Applicants' method determines a first acquisition gain error. Using that first acquisition gain error, Applicants' method then calculates a second acquisition gain level multiplying the first acquisition gain error times the acquisition multiplier coefficient, and adding that multiplication product to the first acquisition gain level.

Alternatively, if the first signal does not comprise information read from a calibration region, then Applicants' method provides a first tracking gain level and a tracking multiplier coefficient, and calculates a first gain adjusted signal comprising the multiplication product of the first signal and the first tracking gain level. To dynamically adjust that tracking gain level, Applicants' method determines a first tracking gain error. Using that first tracking gain error, Applicants' method then calculates a second tracking gain level by multiplying the first tracking gain error times the tracking multiplier coefficient, and adding that multiplication product to the first tracking gain level.

BRIEF DESCRIPTION OF THE DRAWINGS

The invention will be better understood from a reading of the following detailed description taken in conjunction with the drawings in which like reference designators are used to designate like elements, and in which:

FIG. 2 is a block diagram showing the track layout of a magnetic tape head;

DETAILED DESCRIPTION OF THE PREFERRED EMBODIMENTS

Referring to the illustrations, like numerals correspond to like parts depicted in the figures. The invention will be described as embodied in a read channel assembly disposed in a tape drive unit. The following description of Applicant's method to adjust the amplitudes of a plurality of digital signals is not meant, however, to limit Applicant's invention to either reading information from a magnetic tape, or to data processing applications, as the invention herein can be applied to reading information from an information storage medium in general.

Figure 3:
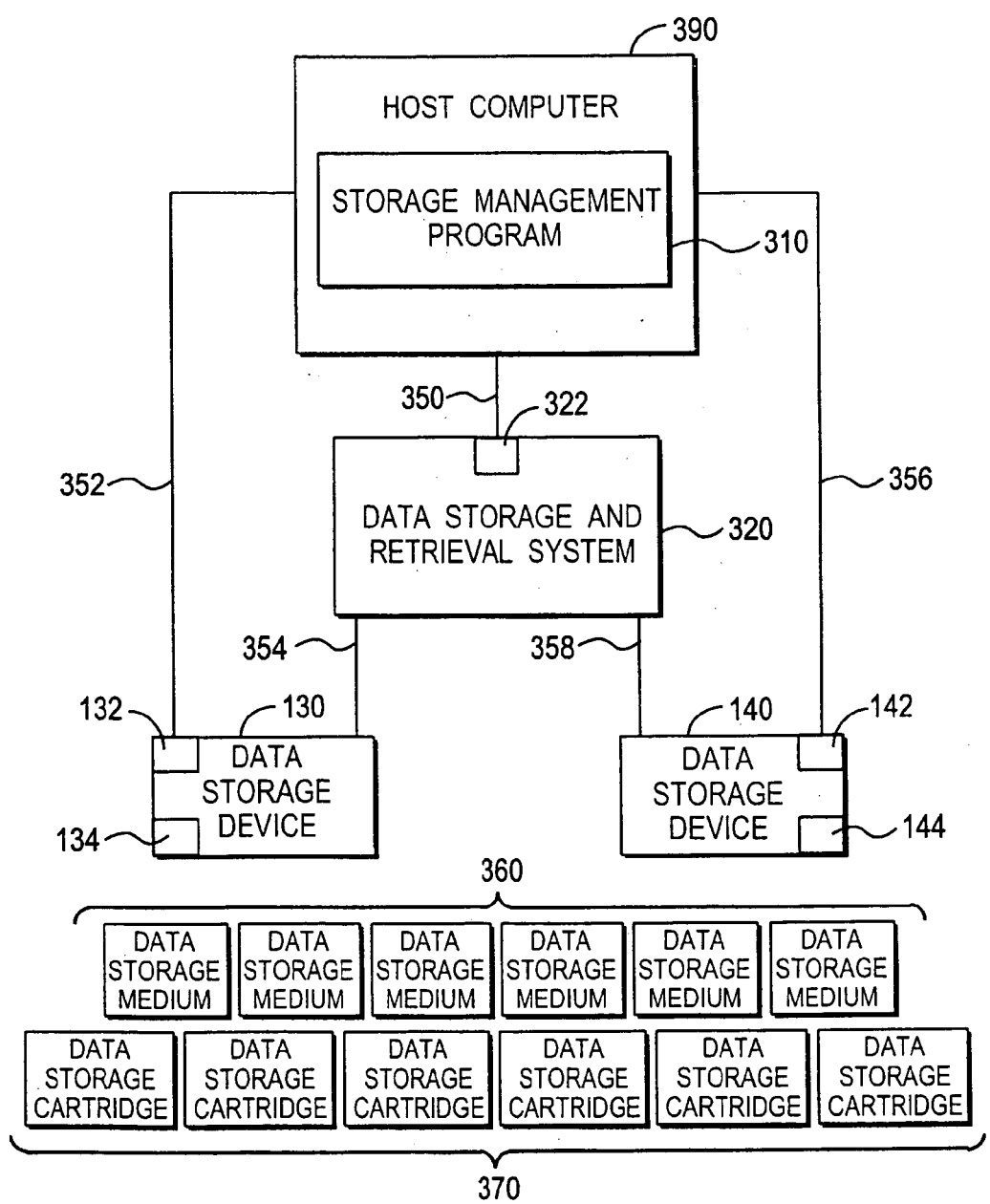
FIG. 3 is a block diagram showing the components of Applicants' data storage and retrieval system.

FIG. 3 illustrates the hardware and software environment in which preferred embodiments of the present invention are implemented. Host computer 390 includes, among other programs, a storage management program 310. In certain embodiments, host computer 390 comprises a single computer. In alternative embodiments, host computer 390 comprises one or more mainframe computers, one or more work stations, one or more personal computers, combinations thereof, and the like.

Information is transferred between the host computer 390 and secondary storage devices managed by a data storage and retrieval system, such as data storage and retrieval system 320, via communication links 350, 352, and 356. Communication links 350, 352, and 356, comprise a serial interconnection, such as an RS-232 cable or an RS-422 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In the embodiment shown in FIG. 3, data storage and retrieval system 320 includes data storage devices 130 and 140. In alternative embodiments, Applicants' data storage and retrieval system 320 includes more than two data storage devices.

A plurality of portable data storage media 360 are moveably disposed within Applicants' data storage and retrieval system. In certain embodiments, the plurality of data storage media 360 are housed in a plurality of portable data storage cartridges 370. Each of such portable data storage cartridges may be removeably disposed in an appropriate data storage device.

Data storage and retrieval system 320 further includes program logic to manage data storage devices 130 and 140, and plurality of portable data storage cartridges 370. In alternative embodiments, data storage and retrieval system 320 and host computer 390 may be collocated on a single apparatus. In this case, host computer 390 may be connected to another host computer to, for example, translate one set of library commands or protocols to another set of commands/protocols, or to convert library commands from one communication interface to another, or for security, or for other reasons.

Host computer 390 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) The storage management program 310 in the host computer 390 may include the functionality of storage management type programs known in the art that manage the transfer of data to a data storage and retrieval system, such as the IBM DFSMS implemented in the IBM MVS operating system.

The data storage and retrieval system 320 comprises a computer system, and manages, for example, a plurality of tape drives and tape cartridges. In such tape drive embodiments, tape drives 130 and 140 may be any suitable tape drives known in the art, e.g., the TotalStorage™ 3590 tape drives (TotalStorage is a trademark of IBM Corporation). Similarly, tape cartridges 370 may be any suitable tape cartridge device known in the art, such as ECCST, Magstar, TotalStorage™ 3420, 3480, 3490E, 3580, 3590 tape cartridges, etc.

Figure 1:
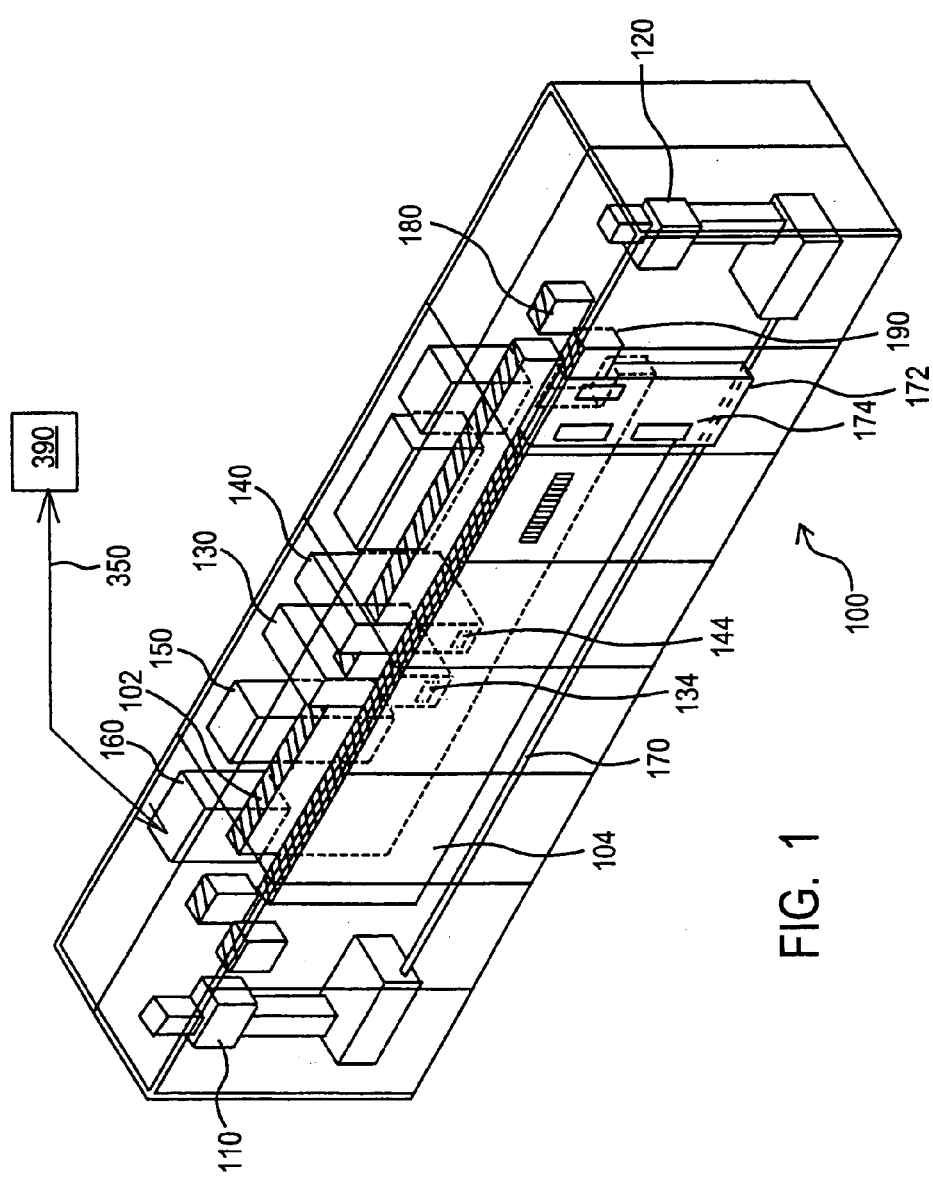
FIG. 1 is a perspective view of a first embodiment of Applicant's data storage and retrieval system.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in portable container, i.e. a cartridge. Examples of such data storage media include magnetic tapes, magnetic disks of various types, optical disks of various types, electronic storage media, and the like.

Applicant's automated data storage and retrieval system includes one or more accessors, such as accessors 110 and 120. As shown in FIG. 1, accessors 110 and 120 travel bi-directionally along rail 170 in an aisle disposed between first wall of storage slots 102 and second wall of storage slots 104. An accessor is a robotic device which accesses portable data storage media from first storage wall 102 or second storage wall 104, transports that accessed media to data storage devices 130/140 for reading and/or writing data thereon, and returns the media to a proper storage slot. Data storage device 130 includes data storage device controller 134. Data storage device 140 includes data storage device controller 144.

Device 160 comprises a library controller. In certain embodiments, library controller 160 is integral with a computer. Operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172/access door 174.

In the embodiments wherein data storage drive 130 and/or 140 comprises a tape drive unit, that tape drive unit includes, inter alia, a tape head. Referring now to FIG. 2, multi-element tape head 200 includes a plurality of read/write elements to record and read information onto and from a magnetic tape. In certain embodiments, magnetic tape head 200 comprises a thin-film magneto-resistive transducer. In an illustrative embodiment, tape head 200 may be constructed as shown in FIG. 2. The length of the tape head 200 substantially corresponds to the width of a magnetic tape. In certain embodiments tape head 200 includes thirty-two read/write element pairs (labeled "RD" and "WR") and three sets of servo read elements, LS 1 and RS6 for example, corresponding to the three servo areas written to the magnetic tape. In the illustrated embodiment, the thirty-two read/write element pairs are divided into groups of eight, i.e. groups 201, 221, 241, and 261.

Tape head 200 further includes a plurality of servo sensors to detect servo signals comprising prerecorded linear servo edges on the magnetic tape. In the embodiment of FIG. 2, adjacent groups of 8 read/write pairs are separated by two tracks occupied by a group of four servo sensors. Each group of four servo sensors may be referred to as a "servo group", e.g. servo group 211, servo group 231, and servo group 251.

In the illustrated embodiment, tape head 200 includes left and right modules separately fabricated, then bonded together. Write and read elements alternate transversely down the length of each module (i.e., across the width of the tape), beginning with a write element in position on the left module and a read element in the corresponding position on the right module. Thus, each write element in the left module is paired with a read element in the corresponding position on the right module and each read element in the left module is paired with a write element in the corresponding position on the right module such that write/read element pairs alternate transversely with read/write element pairs.

Figure 4:
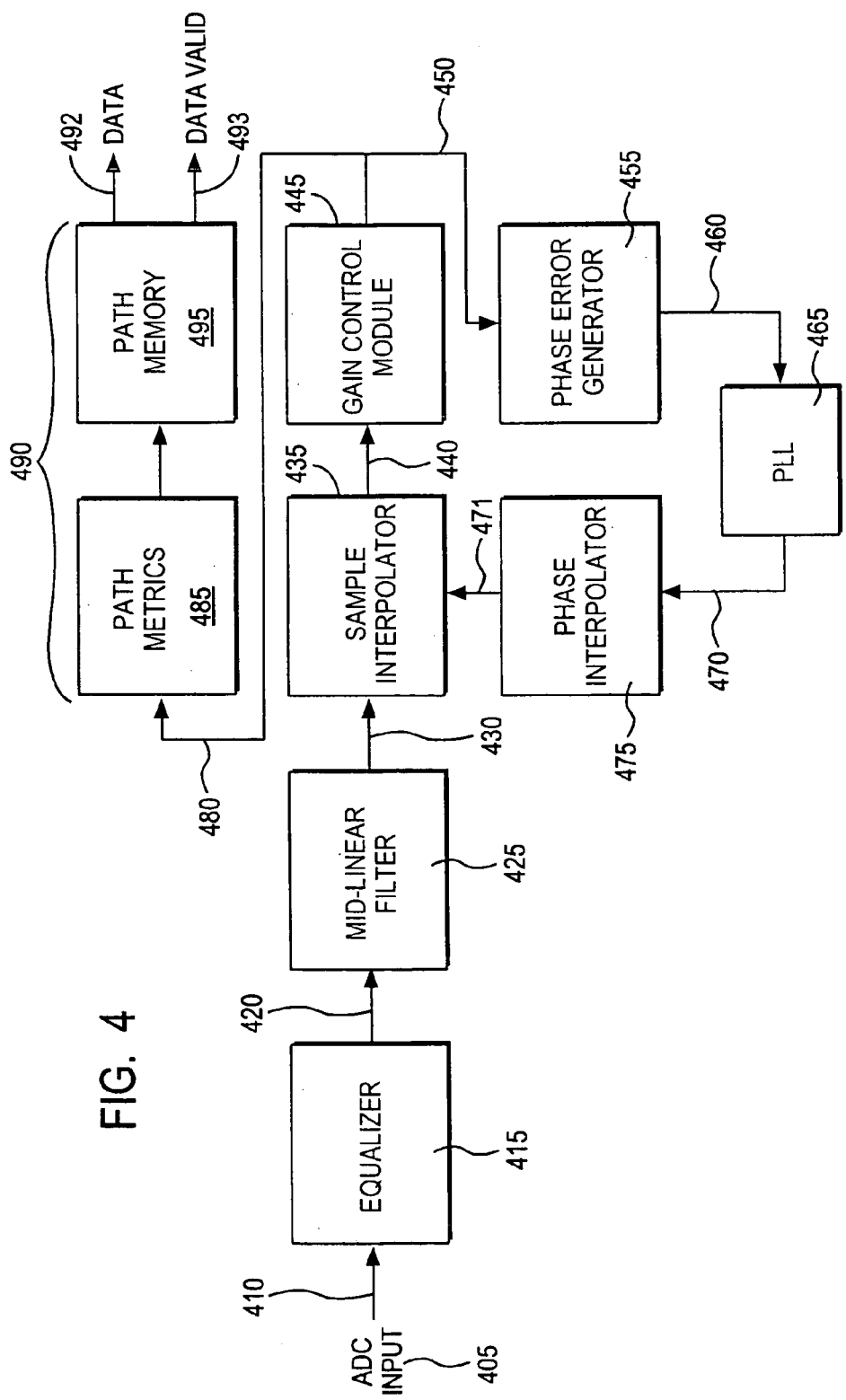
FIG. 4 is a block diagram showing the components of Applicants' read channel assembly when used in the tracking mode.
Figure 17:
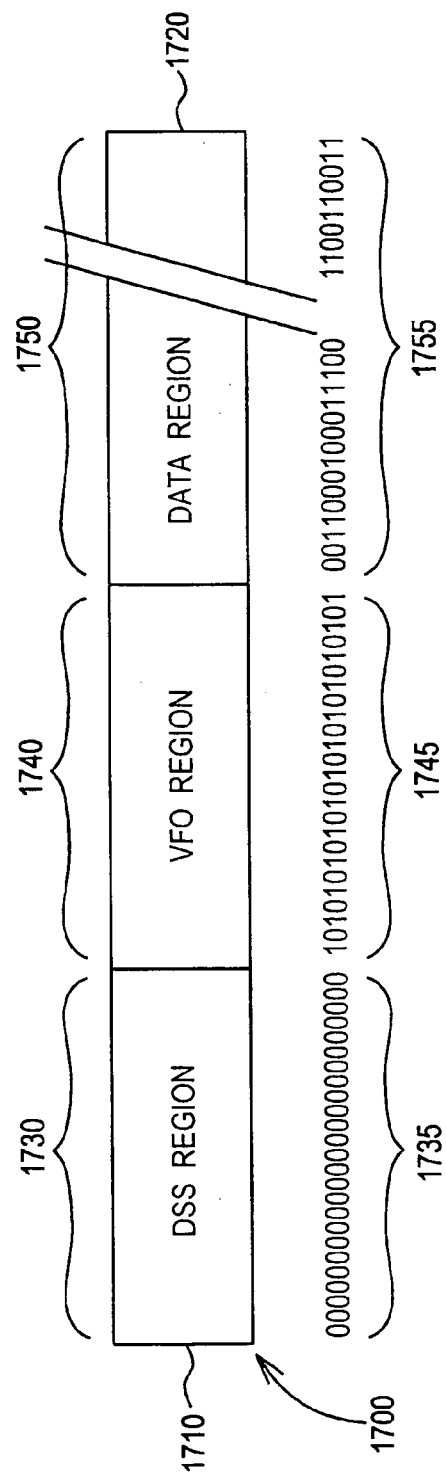
FIG. 17 is a block diagram showing typical formatting used in magnetic tape storage media.

FIG. 4 shows the components and data flow of Applicants' asynchronous read detect channel assembly when used in a "tracking" mode. By tracking mode, Applicants mean reading information from a data region of an information storage medium, such as data region 1750 (FIG. 17). FIG. 17 shows certain of the typical tape formatting used in magnetic tapes. Referring now to FIG. 17, magnetic tape 1700 includes first end 1710 and second end 1720. Disposed between first end 1710 and second end 1720 are, among other regions, a DSS region 1730, a VFO region 1740, and a data region 1750.

Information 1735 is typically encoded in the DSS region. DSS regions 1730 is a calibration field with a low frequency of "1"s. Generally, user data is not encoded in DSS region 1730. Information 1745 is typically encoded in the VFO region. VFO region 1740 is a calibration field with a high frequency of "1"s. Generally, user data is not encoded in VFO region 1740. Data region 1750 includes the user data encoded on the tape medium.

In the illustrated embodiment of FIG. 4, Applicants' asynchronous read detect channel assembly includes equalizer 415, mid-linear filter 425, sample interpolator 435, gain control module 445, phase-error generator 455, PLL circuit 465, phase interpolator 475, path metrics module 485, path memory 495. In certain embodiments, path metrics module 485 in combination with path memory 495 comprises an assembly known as a maximum likelihood detector, such as maximum likelihood detector 490.

When reading information from a magnetic tape using a read head, such as read/write head 200, an analog waveform comprising that information is first formed. An analog to digital converter converts the analog waveform to first digital waveform 405. That first digital waveform is provided to equalizer 415 using communication link 410. In certain embodiments, equalizer 415 comprises a finite impulse response ("FIR") filter. Such a FIR filter shapes the first digital waveform to produce a second digital signal.

The second digital signal formed in equalizer 415 is provided to mid-linear filter 425 using communication link 420. Mid-linear filter 425 determines the value of the equalized signal at the middle of the sample cell. Mid-linear filter 425 produces a third digital signal which includes the equalized signal and the value of the equalized signal at the middle of the sample cell.

The third digital signal formed in mid-linear filter 425 is provided to sample interpolator 435 via communication link 430. Sample interpolator 435 receives the third digital signal from mid-linear filter 425 and using the output of PLL circuit 465 estimates the equalized signal at the synchronous sample time. By synchronous sample time, Applicants mean the time when the bit cell clock arrives. PLL circuit 465 provides this time. Sample interpolator 435 provides one or more fourth digital, synchronous signals.

The one or more fourth digital, synchronous signals formed by sample interpolator 435 are provided to gain control module 445 via communication link 440. Gain control module 445 adjusts the amplitude of the one or more fourth signals to form one or more fifth digital signals having amplitudes set to preset levels required by the maximum likelihood detector 490. In the illustrated embodiment, the maximum likelihood detector 490 comprises path metrics module 485 and path memory 495. The one or more fifth digital signals are provided to maximum likelihood detector 490 via communication link 480. The output of the maximum likelihood detector is data on communication link 492 and a data valid signal on communication link 493.

The one or more fifth digital signals formed by gain control circuit 445 are also provided to phase-error generator 455 via communication link 450. Phase-error generator 455 estimates the phase of the one or more fifth digital signals and generates an error signal that is provided to PLL circuit 465 via communication link 460.

The phase-error is processed by PLL circuit 465 which filters the phase-error and determines the locations of the synchronous bit cell boundaries. The locations of the synchronous bit cell boundaries are provided to phase interpolator 475 and sample interpolator 435 via communication links 470 and 471, respectively.

Figure 5:
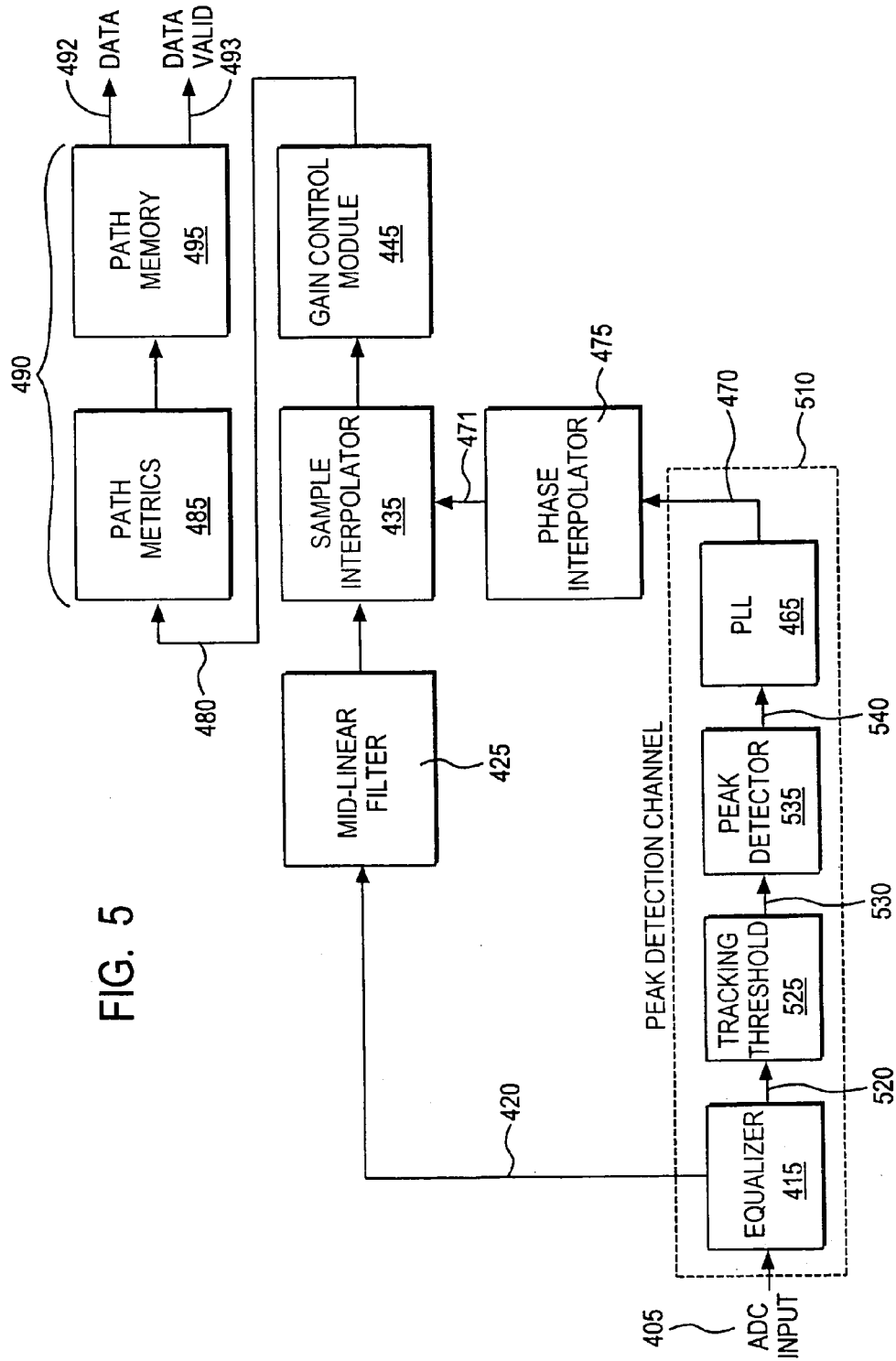
FIG. 5 is a block diagram showing the components of Applicants' read channel assembly when used the acquisition mode.

FIG. 5 shows the components and data flow of Applicants' asynchronous read detect channel assembly when used in an "acquisition" mode. By acquisition mode, Applicants mean reading information from a calibration region of an information storage medium, such as VFO region 1740 (FIG. 17). In the illustrated embodiment of FIG. 5, Applicants' read channel includes peak detection channel 510 comprising equalizer 415, tracking threshold module 525, peak detector 535, and PLL circuit 465. Equalizer 415 provides the second digital signal to tracking threshold module 525 via communication link 520. Tracking threshold module 525 provides derives a positive and negative threshold level where those threshold levels comprise some fraction of the average peak level. The tracking threshold module 525 provides these thresholds to the peak detector 535 along with the equalized signal from the equalizer 415 via communication link 530.

Peak detector 535 determines the locations of the "1"s in the data stream. A "1" occurs if there is a peak and the peak amplitude is greater than the threshold provided by the tracking threshold module 525. Peak detector 535 provides a digital signal representing the location of the peak and a peak-detected qualifier to the PLL circuit 465 via communication link 540.

Figure 6A:
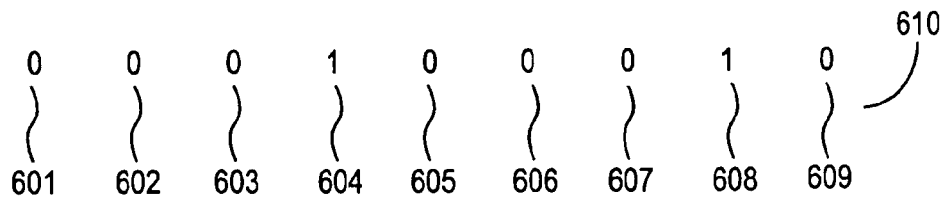
FIG. 6A shows digital information comprising a series of "1"s and "0"s.
Figure 6B:
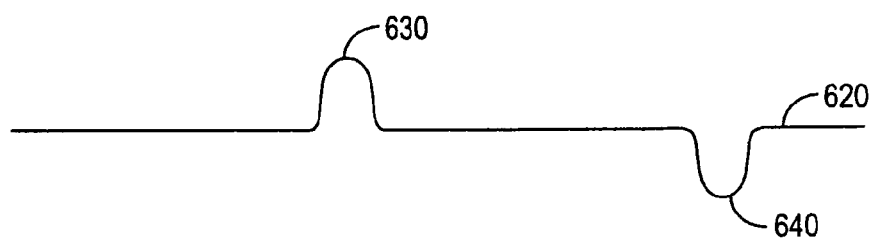
FIG. 6B shows a prior art waveform comprising the information of FIG. 6A read from an information storage medium.
Figure 6C:
FIG. 6C shows a prior art method of detecting information of FIG. 6A from the waveform of FIG. 6B.

Referring now to FIG. 6A, information 610 comprises data 601, 602, 603, 604, 605, 606, 607, 608, and 609, having the values shown in FIG. 6A. Referring now to FIG. 6B, using prior art apparatus and methods to read information 610 from an information storage medium, those prior art apparatus and methods produce waveform 620. Waveform 620 includes positive peak 630 and negative peak 640. Referring now to FIG. 6C, after generating waveform 620 prior art apparatus and methods parse that waveform into discrete regions 651, 652, 653, 654, 655, 656, 657, 658, and 659. Those prior art methods would then recognize regions 654 and 658 as comprising data having a value of "1," and regions 651, 652, 653, 655, 656, 657, and 659, as comprising data having a value of "0."

Figure 7:
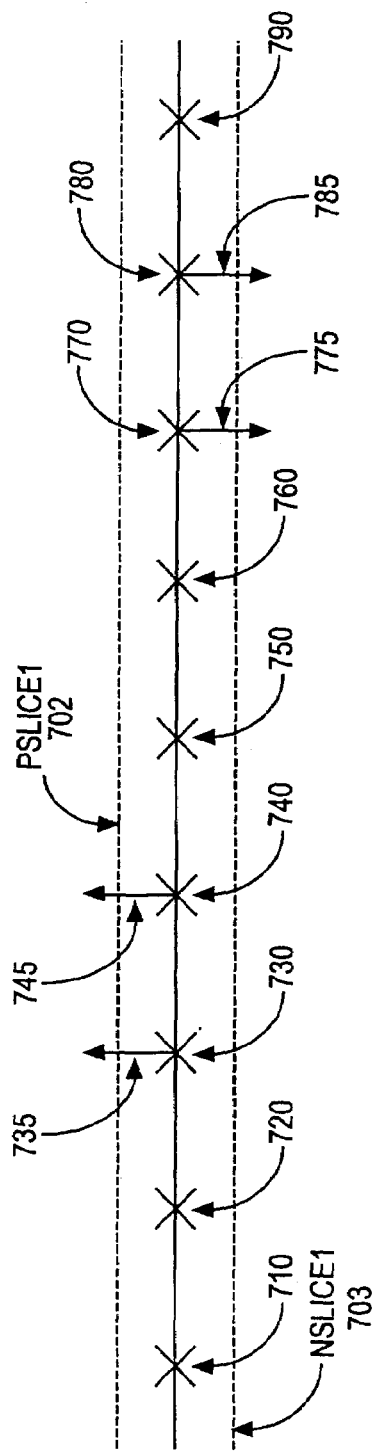
FIG. 7 is a representation of digital signals detected using a first embodiment of Applicants' apparatus.

As the storage density of information storage media has increased, i.e. as the intervals between individual datapoints on that media has decreased, it has become increasingly difficult to differentiate valid signals from noise. FIG. 7 shows the signals detected by Applicants' maximum likelihood detector 490 when reading information, such as information 610, encoded on an information storage medium, where detector 490 comprises a PR-4 maximum likelihood detector. Such a maximum likelihood detector samples the digital signal comprising information read from an information storage medium at discrete time points, i.e. time points 710, 720, 730, 740, 750, 760, 770, 780, and 790. In order to recognize a valid data signal, the detector must detect two signals at consecutive sampling times, and each of those signals must exceed a threshold value.

For example, if Applicants' maximum likelihood PR-4 detector 490 detects signal 735 and signal 745 at sample times 730 and 740, respectively, and if signals 735 and 745 both exceed the threshold denominated PSLICE1, then Applicants' detector 490 determines that most likely a "1 1" pattern was sent. Detector 490 then determines that datapoint 740 comprises information having a value of "1". Similarly, if Applicants' maximum likelihood PR-4 detector 490 detects signal 775 and signal 785 at sampling times 770 and 780, respectively, and if signals 775 and 785 both exceed the threshold denominated NSLICE 1, then Applicants' detector determines that most likely a "1 1" pattern was sent. Detector 490 then determines that datapoint 780 comprises information having a value of "1".

Figure 8:
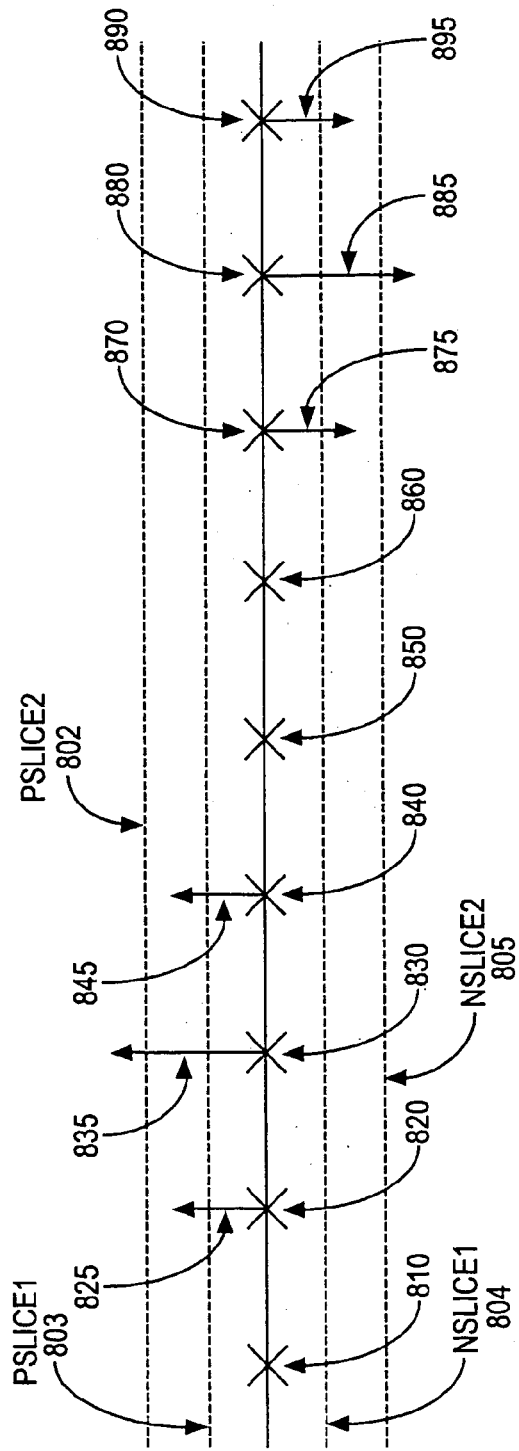
FIG. 8 is a representation of the digital signals detected using a second embodiment of Applicants' apparatus.

FIG. 8 shows the signals detected by Applicants' maximum likelihood detector 490 when reading information, such as information 610, encoded on an information storage medium, where detector 490 comprises an EPR-4 maximum likelihood detector. Such a maximum likelihood detector samples the digital signal comprising information read from an information storage medium at discrete time points, i.e. time points 810, 820, 830, 840, 850, 860, 870, 880, and 890. In order to recognize a valid data signal, the detector must detect three signals at three consecutive sampling times, and the first and third signals must exceed a first threshold value and the second signal must exceed a second threshold value, i.e. a "1 2 1" pattern must be detected.

For example, if Applicants' maximum likelihood EPR-4 detector 490 detects signals 825, 835, and 845, at sampling times 820, 830, and 840, respectively, and if signals 825 and 845 both exceed the threshold denominated PSLICE1, and if signal 835 exceeds the threshold denominated PSLICE2, then Applicants' detector determines that most likely a "1 2 1" pattern was sent. Detector 490 then determines that datapoint 840 comprises information having a value of "1". Similarly, if Applicants' maximum likelihood EPR-4 detector 490 detects signals 875, 885, and 895, at sampling times 870, 880, and 890, respectively, and if signals 875 and 895 both exceed the threshold denominated NSLICE1, and if signal 885 exceeds the threshold denominated NSLICE2, then that detector determines that that most likely a "1 2 1" pattern was sent. Detector 490 then determines that datapoint 890 comprises information having a value of "1".

Applicants' apparatus and method dynamically adjusts the signal amplitude of the signal provided to the maximum likelihood detector. When using a PR-4 detector, Applicants' method determines if a signal is detected, and if the amplitude of that signal exceeds a specified threshold. If these criteria are met, using gain module 445 Applicants' method adjusts the amplitude of that signal based upon a positive target amplitude or a negative target amplitude, as described below.

When using an EPR-4 detector, Applicants' method first determines if a signal is detected, and if the amplitude of that signal exceeds a high threshold or is between a low threshold and that high threshold. If these criteria are met, using gain module 445, Applicants' apparatus and method adjusts the amplitude of that signal based upon a first positive target amplitude, a second positive target amplitude, a first negative target amplitude, or a second negative target amplitude, as described below The initial steps in Applicants' method to dynamically adjust the amplitude of signals provided to maximum likelihood detector 490 (FIG. 4) by gain module 445 (FIG. 4) are summarized in FIG. 10. In step 1005, Applicants' method reads information from an information storage medium. In step 1010, Applicants' method determines if the sample interpolator 435 (FIG. 4) provided the (i)th signal to gain module 445 (FIG. 4). If Applicants' method determines in step 1010 that the (i)th signal was not provided, then Applicants' method transitions from step 1010 to step 1015 wherein (i) is incremented. Applicants' method transitions from step 1015 to step 1010 and continues.

Alternatively, if the (i)th signal was provided, then Applicants' method transitions from step 1010 to step 1020 wherein Applicants' method determines if the (i)th signal comprises information from a calibration region of an information storage medium. Gain module 445 does not perform step 1020. Rather, the determination of step 1020 is performed by a data flow module, and that determination is provided to gain module 445 by an ACQ input described below.

If Applicants' method determines that the (i)th signal comprises information from a calibration region of an information storage medium, then Applicants' method transitions from step 1020 to step 1025. Alternatively, if Applicants' method determines that the (i)th signal comprises information read from a data region of an information storage medium, then Applicants' method transitions from step 1020 to step 1050.

In step 1025, Applicants' method provides the current, i.e. the (j)th gain level. In step 1030, Applicants' method calculates a gain adjusted signal by multiplying the (i)th signal times the (j)th gain level. In step 1035, Applicants' method determines the (k)th acquisition gain error. In certain embodiments, step 1035 includes the steps of FIGS. 11 and 15, and/or the apparatus of FIGS. 12 and 16.

In step 1040, Applicants' method sets the (j+1)th gain level by multiplying the (k)th acquisition gain error times an acquisition multiplier coefficient, such as ACQGAIN 911 (FIG. 9), and adding that multiplication product to the (j)th acquisition gain level. In step 1045, Applicants' method increments (i), (j), and (k). Applicants' method transitions from step 1045 to step 1010 and continues.

In step 1050, Applicants' method provides the current, i.e. the (l)th gain level. In step 1055, Applicants' method calculates a gain adjusted signal by multiplying the (i)th signal times the (l)th gain level. In step 1060, Applicants' method determines the (m)th tracking gain error. In certain embodiments, step 1060 includes the steps of FIGS. 13 and 15, and/or the apparatus of FIGS. 14 and 16.

In step 1065, Applicants' method sets the (l+1)th gain level by multiplying the (m)th tracking gain error times a tracking multiplier coefficient, such as TRKGAIN 912 (FIG. 9), and adding that multiplication product to the (l)th tracking gain level. In step 1070, Applicants' method increments (i), (l), and (m). Applicants' method transitions from step 1070 to step 1010 and continues.

Figure 9:
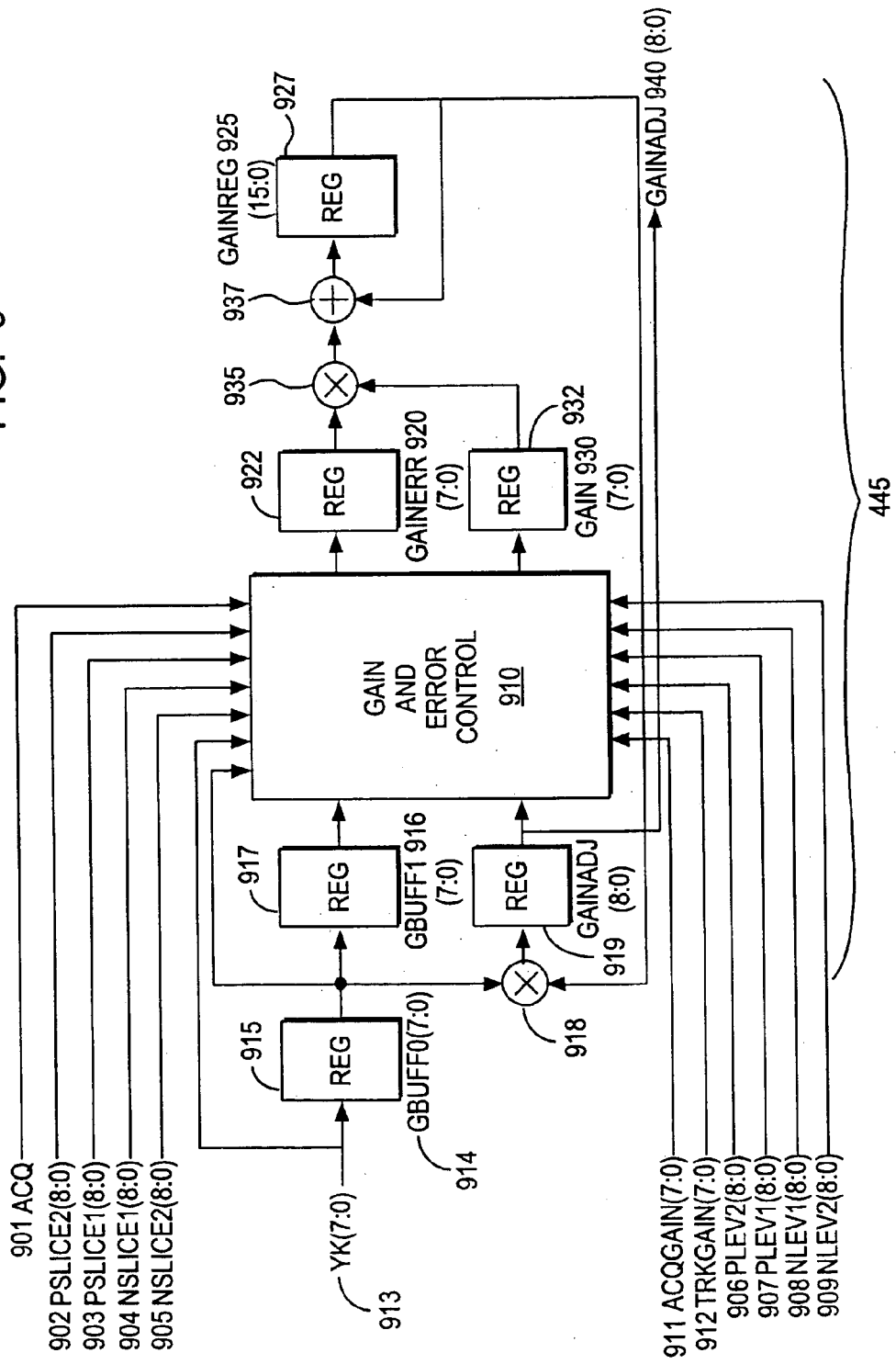
FIG. 9 is a block diagram of Applicants' gain control module.
Figure 10:
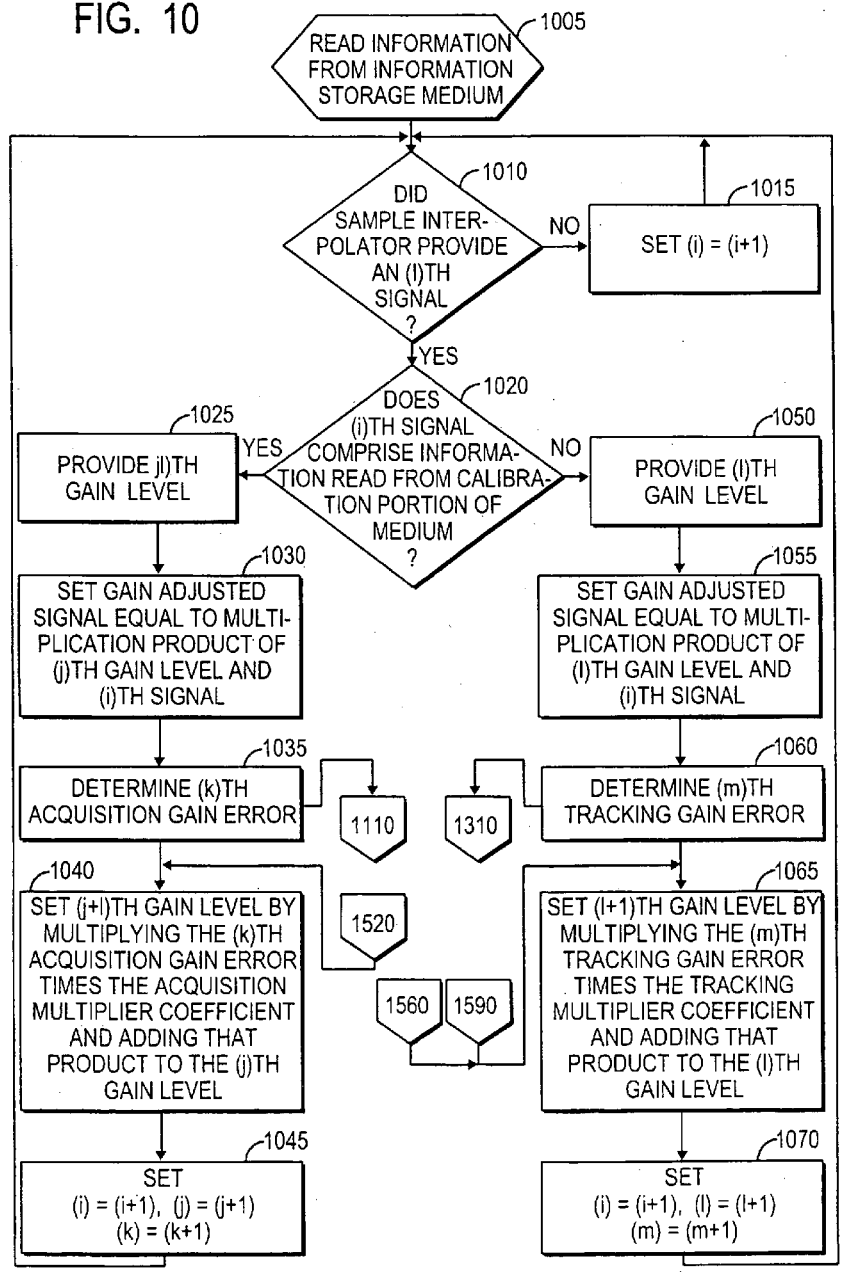
FIG. 10 is a flow chart summarizing certain steps in Applicants' method.

In certain embodiments, the steps of FIG. 10 are implemented by the circuitry shown in FIG. 9. In the illustrated embodiment, gain module 445 includes gain and error control assembly 910, first register 915, second register 917, third register 919, fourth register 922, fifth register 927, and sixth register 932. Applicants' method provides programmable input signals to assembly 910, where those programmable inputs include ACQ signal 901. ACQ signal 901 indicates if information is being read from a calibration portion of an information storage medium or from a data portion of that medium. In certain embodiments, if information is being read from a calibration portion, then ACQ signal 901 has a value of 1.

Input 902 corresponds to the PSLICE2 level 802 (FIG. 8). PSLICE2 comprises the second positive threshold level. Input 903 corresponds to PSLICE1 level 702 shown in FIG. 7 or PSLICE1 level 803 shown in FIG. 8. PSLICE1 comprises the first positive threshold level. Input 904 corresponds to NSLICE 1 703 shown in FIG. 7 or NSLICE 1 804 shown in FIG. 8. NSLICE 1 comprises the first negative threshold level. Input 905 corresponds to NSLICE2 805 shown in FIG. 8. NSLICE2 805 comprises the second negative threshold.

Input PLEV2 906 comprises the second positive target amplitude. Input PLEV1 907 corresponds to the first positive target amplitude. Input NLEV1 908 comprises the first negative target amplitude. Input NLEV2 909 comprises the second negative target amplitude. ACQGAIN 911 comprises the multiplier coefficient used in the acquisition mode. TRKGAIN 912 comprises the multiplier coefficient used in the tracking mode.

YK input 913 comprises the (i+2)th signal provided to gain module 445. GBUFF0 914 comprises the (i+1)th signal provided to gain module 445. In the illustrated embodiment of FIG. 9, GUFF0 914 is disposed in register 915. GBUFF1 916 is the (i)th signal provided to gain module 445. In the illustrated embodiment of FIG. 9, GBUFF1 916 is disposed in register 917.

GAINERR 920 comprises the calculated gain error. The computation of GAINERR 920 is described below. If ACQ 901 is 1, i.e. the signals provided gain module 445 comprise information read from a calibration region of an information storage medium, then GAINERR 920 comprises an acquisition gain error. Alternatively, If ACQ 901 is 0, i.e. the signals provided gain module 445 comprise information read from a data region of an information storage medium, then GAINERR 920 comprises a tracking gain error.

GAINREG 925 comprises the gain level and is disposed in register 927. GAIN 930 comprises a multiplier coefficient and is disposed in register 932. If ACQ 901 is 1, then GAIN 930 comprises ACQGAIN 911. Alternatively, if ACQ is 0, then GAIN 930 comprises TRKGAIN 912. GAINERR 920 is multiplied by GAIN 930 in multiplier circuit 935, and that product to added to GAINREG in addition circuit 937 to provide an updated gain level in register 927. GAINREG 925 is provided to multiplication circuit 918, wherein GAINREG 925 is multiplied by GBUFF0 to form GAINADJ 940 which comprises the current gain adjusted signal.

Figure 11:
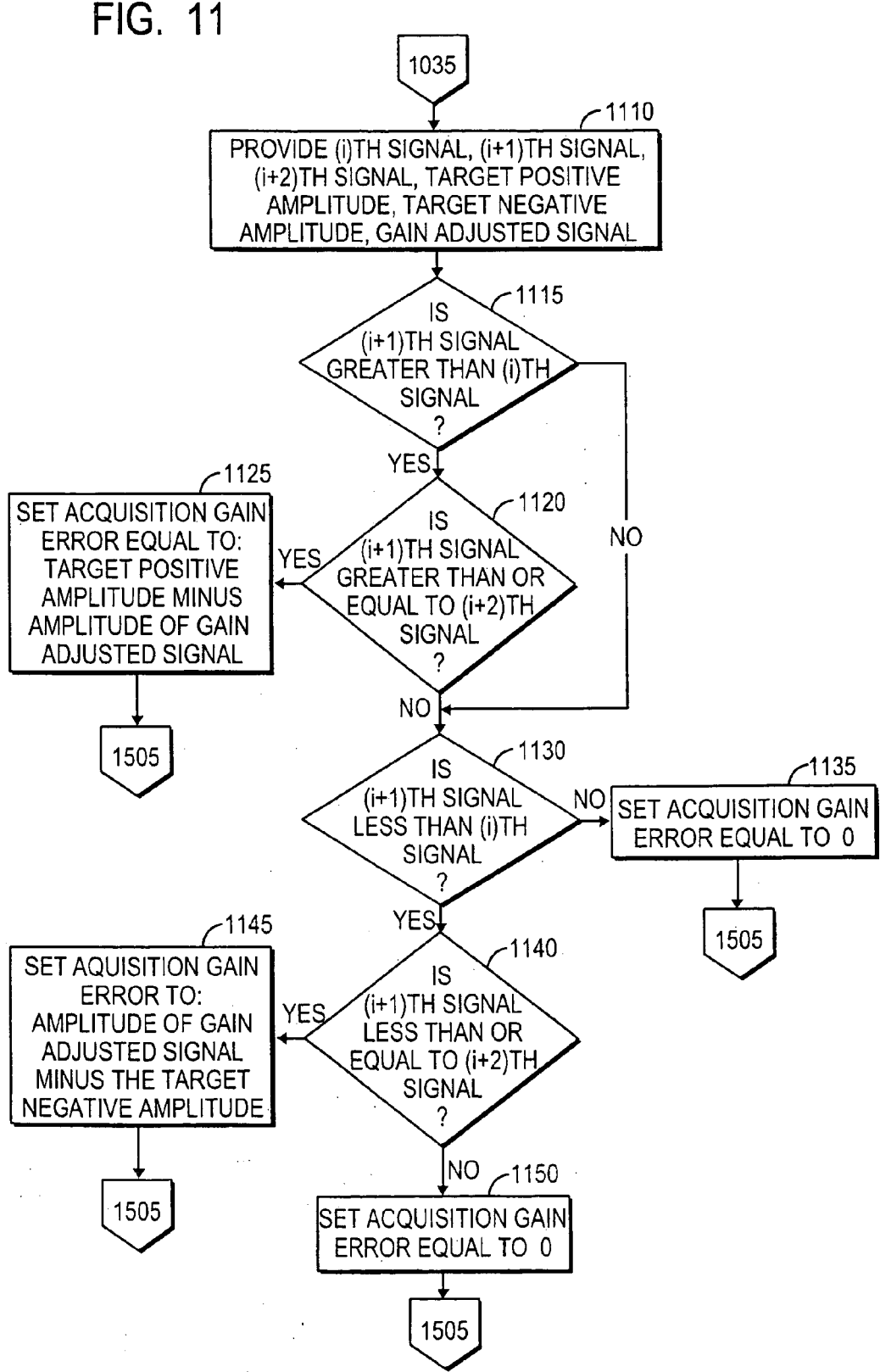
FIG. 11 is a flow chart summarizing the initial steps in Applicants' method to determine the acquisition gain error.

FIG. 11 summarizes the steps of Applicants' method to set the acquisition gain error. Referring now to FIG. 11, Applicants' method transitions from step 1035 (FIG. 10) to step 1110 wherein Applicants' method provides the (i)th signal, i.e. YK 913, the (i+1)th signal, i.e. GBUFF0 914, the (i+2)th signal, i.e. GBUFF1 916, the target positive amplitude, i.e. PLEV2 906, target negative amplitude, i.e. NLEV2 909, and the gain adjusted signal, i.e. GAINADJ 940.

Applicants' method first determines if the digital signal sampled comprises a positive peak in steps 1115 and 1120, or a negative peak in steps 1130 and 1140. If the digital signal sampled does not comprise either a positive peak or a negative peak, then Applicants' method sets the acquisition gain error to 0.

Applicants' method transitions from step 1110 to step 1115 wherein Applicants' method determines if the (i+1)th signal is greater than the (i)th signal. If Applicants' method determines in step 1115 that the (i+1)th signal is greater than the (i)th signal, then Applicants' method transitions from step 1115 to step 1120 wherein Applicants' method determines if the (i+1)th signal is greater than or equal to the (i+2)th signal.

Figure 12:
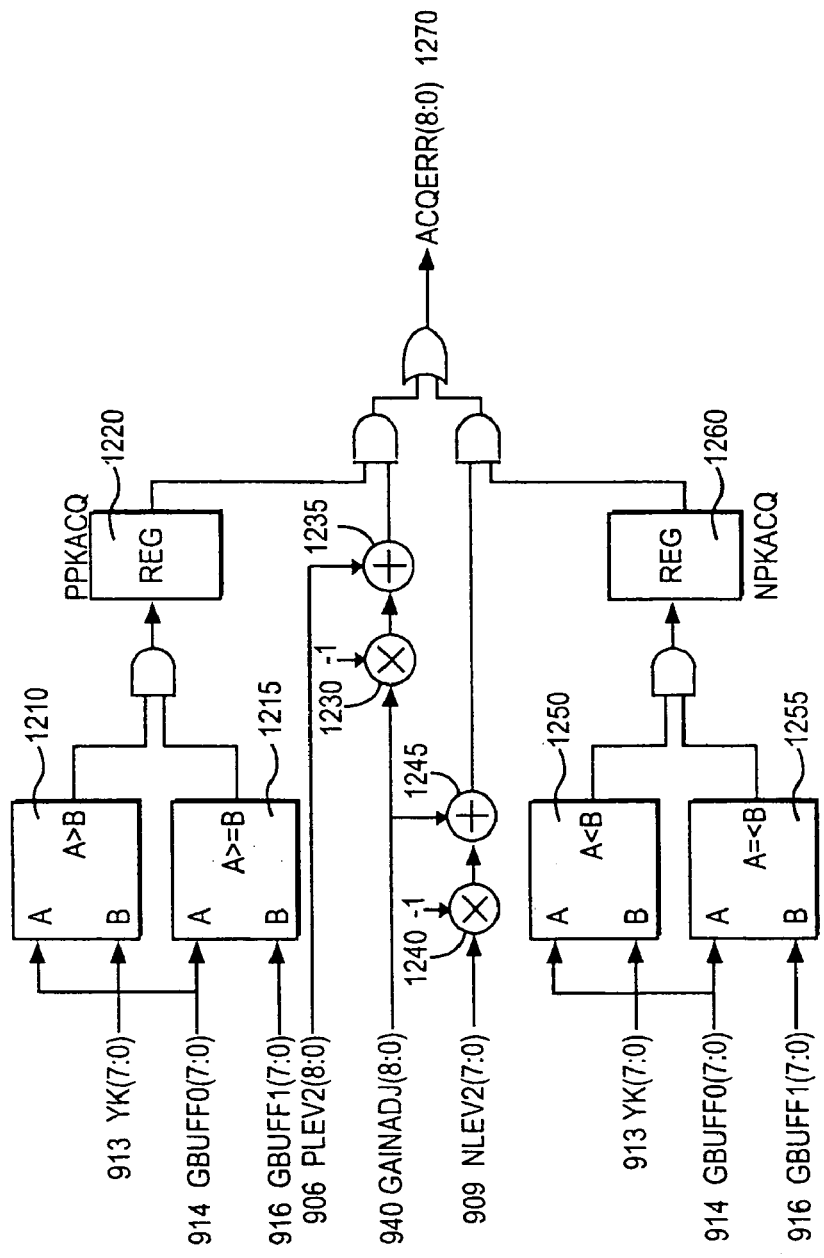
FIG. 12 is a block diagram showing one embodiment of a first portion of Applicants' apparatus to determine the acquisition gain error.
Figure 14:
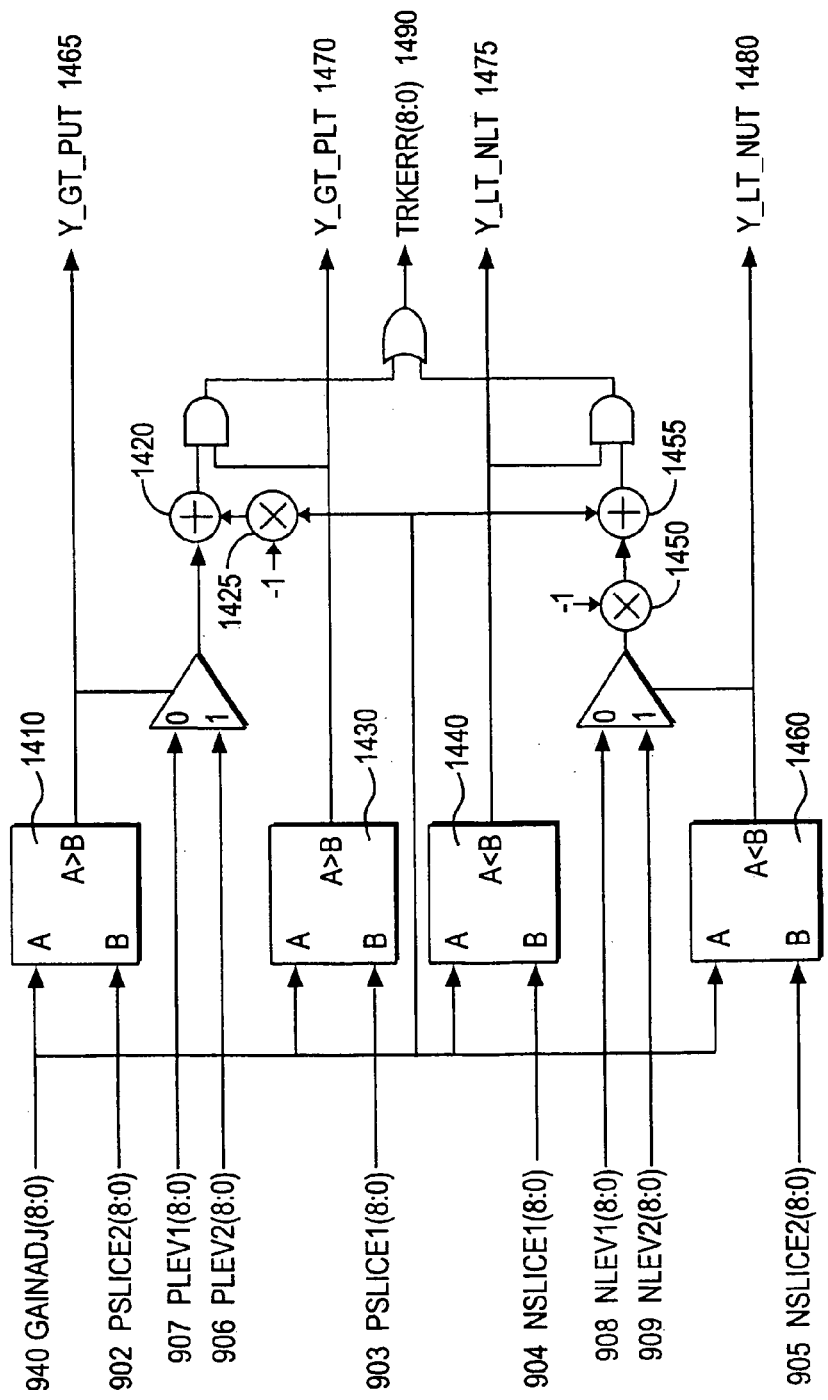
FIG. 14 is a block diagram showing one embodiment of a first portion of Applicants' apparatus to determine the tracking gain error.

If Applicants' method determines in step 1120 that the (i+1)th signal is greater than or equal to the (i+2)th signal, then Applicants' method transitions from step 1120 to step 1125 wherein Applicants' method sets the acquisition gain error, such as ACQERR 1270 (FIGS. 12, 16), to the target positive amplitude, such as PLEV2 906 (FIGS. 9, 12), minus the amplitude of the gain adjusted signal, such as GAINADJ 940 (FIGS. 9, 12, 14). Alternatively, if Applicants' method determines in step 1120 that the (i+1)th signal is not greater than or equal to the (i+2)th signal, then Applicants' method transitions from step 1120 to step 1130.

If Applicants' method determines in step 1115 that the (i+1)th signal is not greater than the (i)th signal, then Applicants' method transitions from step 1115 to step 1130. In step 1130, Applicants' method determines if the (i+1)th signal is less than the (i)th signal. If Applicants' method determines in step 1130 that the (i+1)th signal is not less than the (i)th signal, then Applicants' method transitions from step 1 130 to step 1135 wherein Applicants' method sets the acquisition gain error to 0.

If Applicants' method determines in step 1130 that the (i+1)th signal is less than the (i)th signal, then Applicants' method transitions from step 1130 to step 1140 wherein Applicants' method determines if the (i+1)th signal is less than or equal to the (i+2)th signal. If Applicants' method determines in step 1140 that the (i+1)th signal is not less than or equal to the (i+2)th signal, then Applicants' method transitions from step 1140 to step 1150 wherein Applicants' method sets the acquisition gain error to 0.

Alternatively, if Applicants' method determines in step 1140 that the (i+1)th signal is less than or equal to the (i+2)th signal, then Applicants' method transitions from step 1140 to step 1145 wherein Applicants' method sets the acquisition gain error, such as ACQERR 1270 (FIGS. 12, 16), to the amplitude of the gain adjusted signal, such as GAINADJ 940 (FIGS. 9, 12, 14), minus the target negative amplitude, such as NLEV2 909 (FIGS. 9, 12).

In certain embodiments, the steps of FIG. 11 are implemented in the circuitry of FIG. 12. Steps 1115 and 1120 are performed in circuit blocks 1210 and 1215. If GBUFF0 914 is greater than YK 913, and if GBUFF0 914 is greater than or equal to GBUFF1 916, then a positive peak has been detected and register 1220 is given a value of 1.

Step 1125 is performed by circuits 1230 and 1235. GAINADJ 940 is multiplied by −1 in multiplication circuit 1230 and that value if added to PLEV2 in addition circuit 1235. If register 1220 has a value of 1, then the addition product of circuit 1235 is provided the acquisition gain error, i.e. ACQERR 1270.

Steps 1130 and 1140 are performed in circuit blocks 1250 and 1255. If GBUFF0 914 is less than YK 913, and if GBUFF0 is less than or equal to GBUFF1, then a negative peak has been detected and register 1260 is given a value of 1.

Step 1145 is performed by multiplication circuit 1240 and addition circuit 1245. NLEV2 is multiplied by −1 in multiplication circuit 1240 and added to GAINADJ 940 in addition circuit 1245. If register 1260 has a value of 1, then the addition product of circuit 1245 is provided as the acquisition gain error, i.e. ACQERR 1270. If neither register 1220 or register 1260 is set to a 1, then the ACQERR 1270 is set to zero and no gain error is generated.

Figure 13:
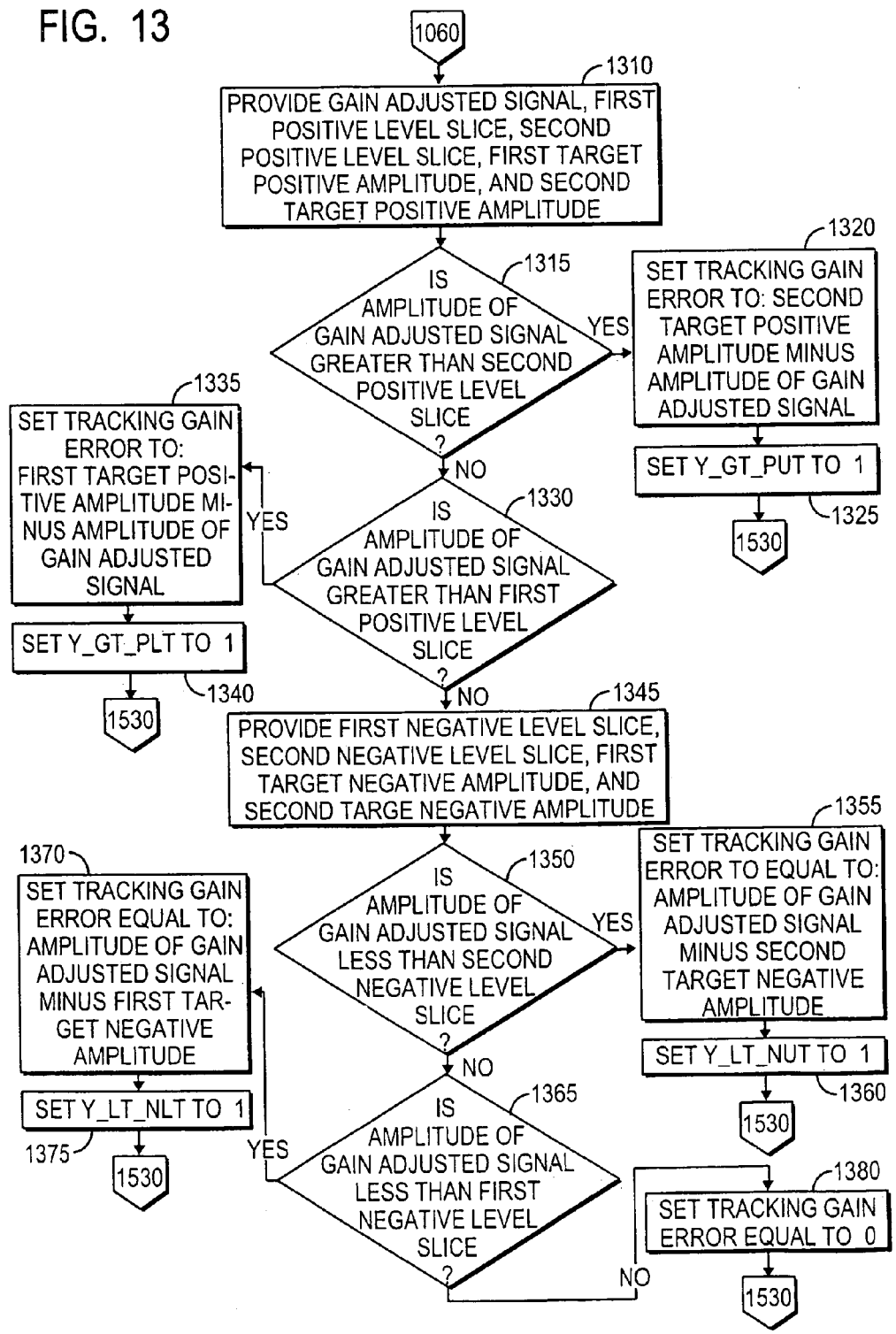
FIG. 13 is a flow chart summarizing the initial steps in Applicants' method to determine the tracking gain error.

FIG. 13 summarizes the steps of Applicants' method to determine the tracking gain error. Applicants' method transitions from step 1060 (FIG. 10) to step 1310 wherein Applicants' method provides the gain adjusted signal, i.e. GAINADJ 940, first positive level slice, i.e. PSLICE 1 903, the second positive level slice, i.e. PSLICE2 902, first target positive amplitude, i.e. PLEV1 907, and second target positive amplitude, i.e. PLEV2 906. When using an PR-4 maximum likelihood detector, Applicants' method sets PSLICE1 equal to PSLICE2 and PLEV1 equal to PLEV2.

Figure 15:
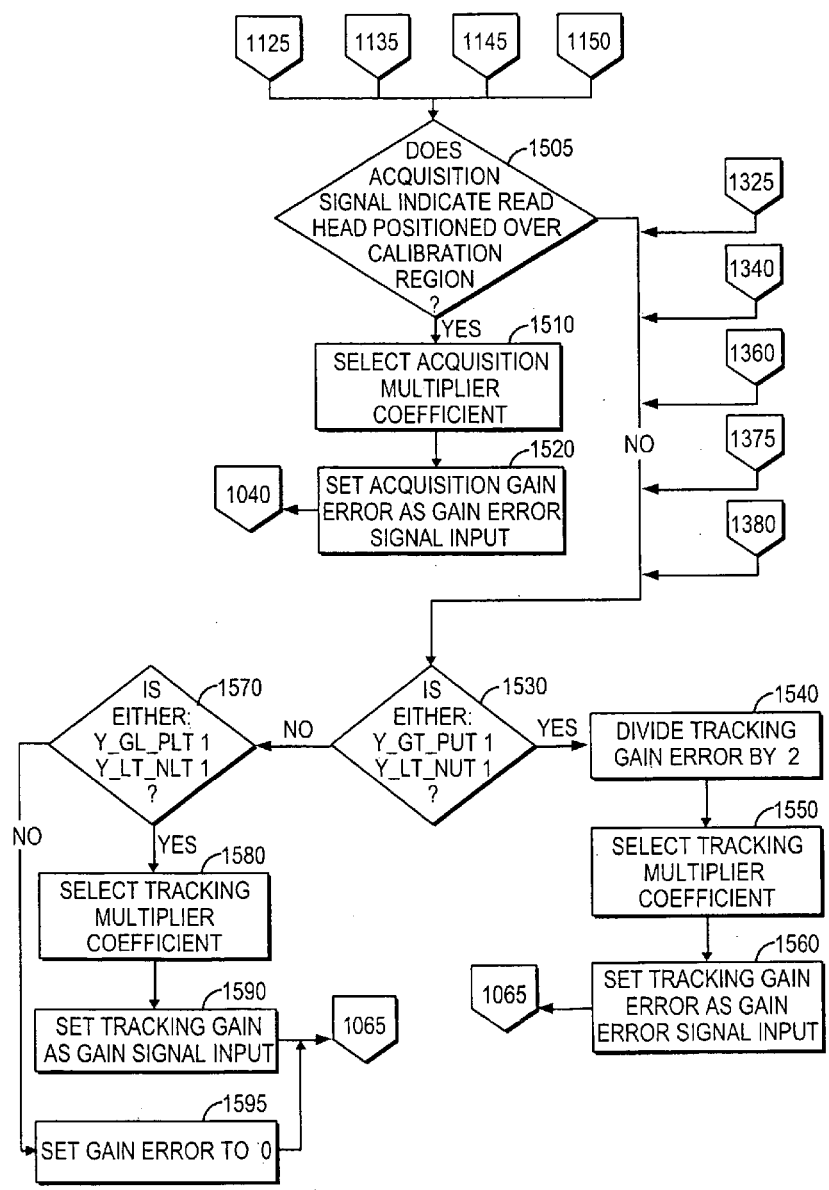
FIG. 15 is a flow chart summarizing certain additional steps to determine the acquisition gain error and the tracking gain error.

In step 1315, Applicants' method determines if the amplitude of the gain adjusted signal is greater than the second positive level slice. If Applicants' method determines in step 1315 that the amplitude of the gain adjusted signal is greater than the second positive level slice, then Applicants' method transitions from step 1315 to step 1320 wherein Applicants' method sets the tracking gain error, such as TRKERR 1490 (FIGS. 14, 16), to the second target positive amplitude, such as PLEV2 906 (FIGS. 9, 14), minus the amplitude of the gain adjusted signal, such as GAINADJ 940 (FIGS. 9, 12, 14). Applicants' method transitions from step 1320 to step 1325 wherein Applicants' method sets the Y_GT_PUT signal 1465 (FIG. 14) to 1. Applicants' method transitions from step 1325 to step 1530 (FIG. 15).

Alternatively, if Applicants' method determines in step 1315 that the amplitude of the gain adjusted signal is not greater than the second positive level slice, then Applicants' method transitions from step 1315 to step 1330 wherein Applicants' method determines if the amplitude of the gain adjusted signal is greater than the first positive level slice. If Applicants' method determines that the amplitude of the gain adjusted signal is greater than the first positive level slice, then Applicants' method transitions from step 1330 to step 1335 wherein Applicants' method sets the tracking gain error, such as TRKERR 1490 (FIGS. 14, 16), to the first target positive amplitude, such as PLEV2 906 (FIGS. 9, 14) minus the amplitude of the gain adjusted signal, such as GAINADJ 940 (FIGS. 9, 12, 14). Applicants' method transitions from step 1335 to step 1340 wherein Applicants' method sets the Y_GT_PLT signal to 1. Applicants' method transitions from step 1340 to step 1530

If Applicants' method determines in step 1330 that the amplitude of the gain adjusted signal is not greater than the first positive level slice, then Applicants' method transitions from step 1330 to step 1345 wherein Applicants' method provides the first negative level slice, i.e. NSLICE1 904, second negative level slice, i.e. NSLICE2 905, the first target negative amplitude, i.e. NLEV1 908, and the second target negative amplitude, i.e. NLEV2 909. When using an PR-4 maximum likelihood detector, Applicants' method sets NSLICE1 equal to NSLICE2 and NLEV1 equal to NLEV2.

In step 1350, Applicants' method determines if the amplitude of the gain adjusted signal is less than the second negative level slice. If Applicants' method determines that the amplitude of the gain adjusted signal is less than the second negative level slice, then Applicants' method transitions from step 1350 to step 1355 wherein Applicants' method sets the tracking gain error, such as TRKERR 1490 (FIGS. 14, 16), to the amplitude of the gain adjusted signal, such as GAINADJ 940 (FIGS. 9, 12, 14), minus the second target negative amplitude, such as NLEV2 909 (FIGS. 9, 14). Applicants' method transitions from step 1355 to step 1360 wherein Applicants' method set the Y_LT_NUT signal to 1. Applicants' method transitions from step 1360 to step 1530

Alternatively, if Applicants' method determines in step 1350 that the amplitude of the gain adjusted signal is not less than the second negative level slice, then Applicants' method transitions from step 1350 to step 1365 wherein Applicants' method determines if the amplitude of the gain adjusted signal is less than the first negative level slice. If Applicants' method determines in step 1365 that the amplitude of the gain adjusted signal is less than the first negative level slice, then Applicants' method transitions from step 1365 to step 1370 wherein Applicants' method sets the tracking gain error, such as TRKERR 1490 (FIGS. 14, 16), to the amplitude of the gain adjusted signal, such as GAINADJ 940 (FIGS. 9, 12, 14), minus the first target negative amplitude, such as NLEV1 908 (FIGS. 9, 14). Applicants' method transitions from step 1370 to step 1375 wherein Applicants' method sets the Y_LT_NLT signal 1480 (FIG. 14) to 1. Applicants' method transitions from step 1375 to step 1530

If Applicants' method determines in step 1365 that the amplitude of the gain adjusted signal is not less than the first negative level slice, then Applicants' method transitions from step 1365 to step 1380 wherein Applicants' method sets the tracking gain error to 0. Applicants' method transitions from step 1380 to step 1530.

In certain embodiments, the steps of FIG. 13 are implemented using the circuitry of FIG. 14. Steps 1315 and 1325 are performed by circuit block 1410. Step 1320 is performed by multiplication circuit 1425 and addition circuit 1420. Steps 1330 and 1340 are performed by circuit block 1430. Step 1335 is performed by multiplication circuit 1425 and addition circuit 1420.

Steps 1350 and 1360 are performed by circuit block 1460. Step 1355 is performed by multiplication circuit 1450 and addition circuit 1455. Steps 1365 and 1375 are performed by circuit block 1440. Step 1370 is performed by multiplication circuit 1450 and addition circuit 1455.

FIG. 15 summarizes the steps of Applicants' method to input the calculated acquisition gain error of FIGS. 11 and 12, or the calculated tracking gain error of FIGS. 13 and 14, to assembly 910 (FIG. 9). Referring now to FIG. 15, steps 1125 (FIG. 11), 1135 (FIG. 1), 1145 (FIG. 11), and 1150 (FIG. 11), transition to step 1505 wherein Applicants' method determines if the acquisition signal indicates that the signal being provided comprises information read from a calibration region, i.e. if ACQ 901 is 1. If Applicants' method determines in step 1505 that the signal being provided comprises information read from a calibration region, then Applicants' method transitions from step 1505 to step 1510 wherein Applicants' method provides the acquisition multiplier coefficient, i.e. ACQGAIN 911 (FIGS. 9, 16), as GAIN 930 (FIG. 9). Applicants' method transitions from step 1510 to step 1520 wherein Applicants' method sets the acquisition gain error, i.e. ACQERR 1270 (FIGS. 12, 16), as GAINERR 920 (FIG. 9). Applicants' method transitions from step 1520 to step 1040 (FIG. 10) and continues.

Alternatively, if Applicants' method determines in step 1505 that the signal being provided does not comprise information read from a calibration region, then Applicants' method transitions from step 1505 to step 1530 wherein Applicants' method determines if Y_GT_PUT signal 1465 (FIG. 14) is 1, or if Y_LT_NUT signal 1480 (FIG. 14) is 1. If Applicants' method determines that either Y_GT_PUT signal 1465 (FIG. 14) is 1, or Y_LT_NUT signal 1480 (FIG. 14) is 1, then Applicants' method transitions from step 1530 to step 1540 wherein Applicants' method divides the tracking gain error, i.e. TRKERR 1490 (FIGS. 14, 16), by 2. Applicants' method transitions from step 1540 to step 1550 wherein Applicants' method sets the tracking multiplier coefficient, i.e. TRKGAIN 912 (FIGS. 9, 16), as GAIN 930 (FIG. 9). Applicants' method transitions from step 1550 to step 1560 wherein Applicants' method sets the tracking gain error of step 1540, i.e. [TRKERR 1490]/2, as GAIN ERR 920 (FIG. 9). Applicants' method transitions from step 1560 to step 1065 (FIG. 10) and continues.

Alternatively, if Applicants' method determines that neither Y_GT_PUT signal 1465 (FIG. 14), nor Y_LT_NUT signal 1480 (FIG. 14), is 1, then Applicants' method transitions to step 1570 wherein Applicants' method determines if either Y_GT_PLT signal 1470, or Y_LT_NLT signal 1475, is 1. If Applicants' method determines in step 1570 that either Y_GT_PLT signal 1470, or Y_LT_NLT signal 1475, is 1, then Applicants' method transitions from step 1570 to step 1580 wherein Applicants' method sets the tracking gain error, i.e. TRKERR 1490 (FIGS. 14, 16), as GAINERR 920 (FIG. 9). Applicants' method transitions from step 1580 to step 1590 wherein Applicants' method sets the tracking multiplier coefficient, i.e. TRKGAIN 912 (FIGS. 9, 16), as GAIN 930 (FIG. 9). Applicants' method transitions from step 1590 to step 1050 and continues. If Applicants' method determines in step 1570 that neither Y_GT_PLT signal 1470, nor Y_LT_NLT signal 1475, is 1, then Applicants' method transitions from step 1570 to step 1595 wherein Applicants' method sets the gain error to 0. Applicants' method transitions from step 1595 to step 1065 and continues.

Figure 16:
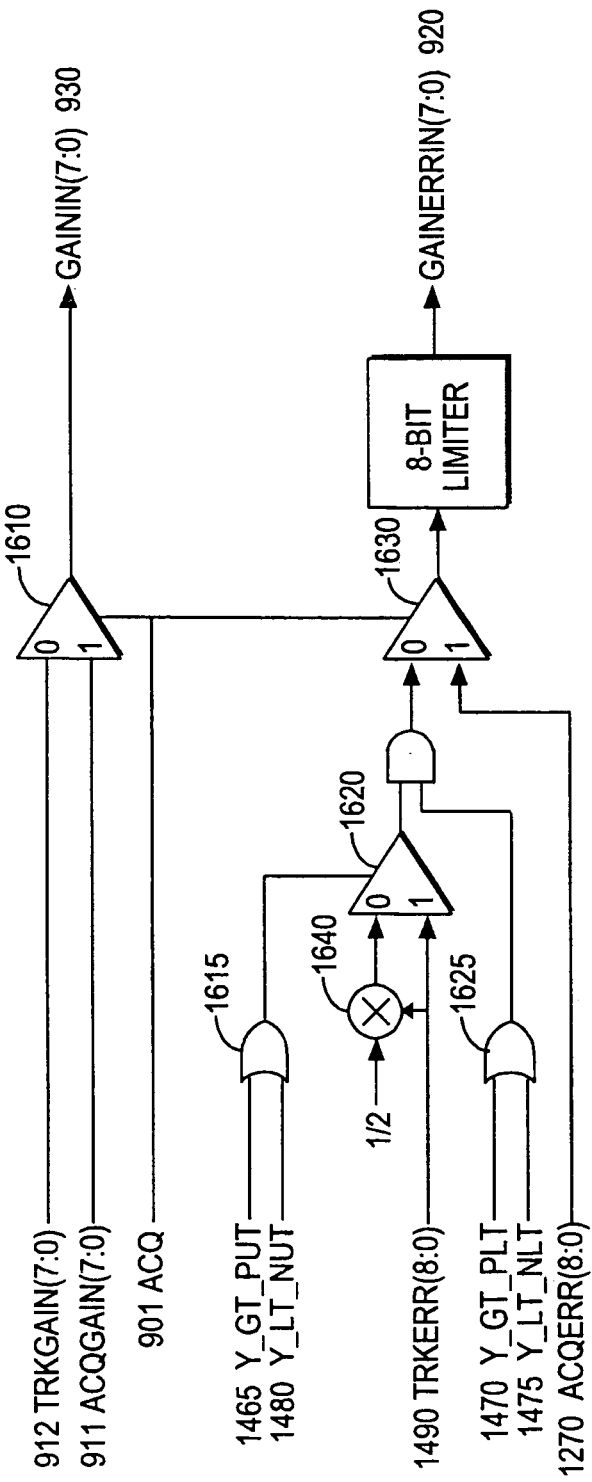
FIG. 16 is a block diagram showing one embodiment of a second portion of Applicants' apparatus to determine the acquisition gain error and the tracking gain error.

In certain embodiments of Applicants' apparatus, the steps of FIG. 15 are implemented using the circuitry of FIG. 16. Steps 1505, 1510, 1550, and 1580, are performed by multiplexer 1610. Step 1530 is performed by comparator 1615. Step 1570 is performed by comparator 1625. Step 1540 is performed by "or" gate 1615. Step 1570 is performed by "or" gate 1625. Steps 1550, 1560, 1580, and 1590, are performed by multiplexer 1630.

Applicants' invention includes an article of manufacture comprising a computer useable medium having computer readable program code disposed therein to adjust the amplitude of a signal comprising information read from an information storage medium. Applicants' invention further includes a computer program product usable with a programmable computer processor having computer readable program code embodied therein to adjust the amplitude of a signal comprising information read from an information storage medium. Such computer program products may be embodied as program code stored in one or more memory devices, such as a magnetic disk, a magnetic tape, or other non-volatile memory device.

The embodiments of Applicants' method recited in FIGS. 10, 1, 13, and/or 15, may be implemented separately. Moreover, in certain embodiments, individual steps recited in FIGS. 10, 11, 13, and/or 15 may be combined, eliminated, or reordered.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to dynamically adjust the amplitude of a signal comprising information read from an information storage medium, comprising the steps of:
    forming (N) digital signals comprising information read from an information storage medium, wherein each of those (N) digital signals comprises an amplitude;
    determining if a first signal comprises information read from a calibration region of said information storage medium, wherein said first signal comprises one of said (N) digital signals;
    if said first signal comprises information read from a calibration region of said information storage medium, providing a first acquisition gain level and an acquisition multiplier coefficient;
    calculating a gain adjusted signal comprising the multiplication product of said first signal and said first acquisition gain level;
    determining an acquisition gain error;
    calculating a second gain level by multiplying said acquisition multiplier coefficient times said acquisition gain error, and adding that multiplication product to said first acquisition gain level.

2. The method of claim 1, further comprising the steps of:
    providing the (i)th signal, wherein said (i)th signal comprises one of said (N) digital signals;
    providing the (i+1)th signal, wherein said (i+1)th signal comprises one of said (N) digital signals;
    providing the (i+2)th signal, wherein said (i+2)th signal comprises one of said (N) digital signals;
    providing a target positive amplitude level;
    providing a target negative amplitude;
    providing said gain adjusted signal, wherein said gain adjusted signal comprises an amplitude;
    determining if the amplitude of said (i+1)th signal is greater than the amplitude of said (i)th signal;
    if the amplitude of said (i+1)th signal is greater than the amplitude of said (i)th signal, determining if the amplitude of said (i+1)th signal is greater than or equal to the amplitude of said (i+2)th signal;
    if the amplitude of said (i+1)th signal is greater than the amplitude of said (i)th signal, and if the amplitude of said (i+1)th signal is greater than or equal to the amplitude of said (i+2)th signal, setting said acquisition gain error to equal said target positive amplitude level minus the amplitude of said gain adjusted signal.

3. The method of claim 2, further comprising the step of:
    if the amplitude of said (i+1)th signal is not greater than the amplitude of said (i)th signal, determining if the amplitude of said (i+1)th signal is less than the amplitude of said (i)th signal;
    if the amplitude of said (i+1)th signal is less than the amplitude of said (i)th signal, determining if the amplitude of said (i+1)th signal is less than or equal to the amplitude of said (i+2)th signal;
    if the amplitude of said (i+1)th signal is less than the amplitude of said (i)th signal, and if the amplitude of said (i+1)th signal is less than or equal to the amplitude of said (i+2)th signal, setting said acquisition gain error to equal the amplitude of said gain adjusted signal minus said target negative amplitude.

4. The method of claim 1, further comprising the steps of:
if said first signal does not comprise information read from a calibration region of said information storage medium, providing a first gain level and a racking multiplier coefficient;
calculating a gain adjusted signal comprising the multiplication product of said first signal and said first gain level;
determining a tracking gain error;
calculating a second gain level by multiplying said tracking multiplier coefficient times said tracking gain error, and adding that multiplication product to said first gain level.

5. The method of claim 4, further comprising the steps of:
providing said gain adjusted signal, wherein said gain adjusted signal comprises an amplitude;
providing a first positive level slice, a second positive level slice, a first target positive amplitude level, and a second target positive amplitude level;
determining if the amplitude of said gain adjusted signal is greater than said second positive level slice;
if the amplitude of said gain adjusted signal is greater than said second positive level slice, setting said tracking gain error equal to said second target positive amplitude level minus the amplitude of said gain adjusted signal;
if the amplitude of said gain adjusted signal is greater than said second positive level slice, providing a Y_GT_PUT signal having a value of 1.

6. The method of claim 5, further comprising the steps of:
if the amplitude of said gain adjusted signal is not greater than said second positive level slice, determining if the amplitude of said gain adjusted signal is greater than said first positive level slice;
if the amplitude of said gain adjusted signal is not greater than said second positive level slice, and if the amplitude of said gain adjusted signal is greater than said first positive level slice, setting said tracking gain error equal to said first target positive amplitude level minus the amplitude of said gain adjusted signal;
if the amplitude of said gain adjusted signal is not greater than said second positive level slice, and if the amplitude of said gain adjusted signal is greater than said first positive level slice, providing a Y_GT_PLT signal having a value of 1.

7. The method of claim 6, further comprising the steps of:
if the amplitude of said gain adjusted signal is not greater than said second positive level slice, and if the amplitude of said gain adjusted signal is not greater than said first positive level slice:
providing a first negative level slice;
providing a second negative level slice;
providing a first target negative amplitude;
providing a second target negative amplitude;
determining if the amplitude of said gain adjusted signal is less than said second negative level slice;
if the amplitude of said gain adjusted signal is less than said second negative level slice, setting said tracking gain error equal to the amplitude of said gain adjusted signal minus said second target negative amplitude;
if the amplitude of said gain adjusted signal is less than said second negative level slice, providing a Y_LT_NLT signal having a value of 1.

8. The method of claim 7, further comprising the steps of:
if the amplitude of said gain adjusted signal is not less than said second negative level slice, determining if the amplitude of said gain adjusted signal is less than said first negative level slice;
if the amplitude of said gain adjusted signal is not less than said second negative level slice, and if the amplitude of said gain adjusted signal is less than said first negative level slice, setting said tracking gain error equal to the amplitude of said gain adjusted signal minus said first target negative amplitude;
if the amplitude of said gain adjusted signal is not less than said second negative level slice, and if the amplitude of said gain adjusted signal is less than said first negative level slice, providing a Y_LT_NLT signal having a value of 1.

9. The method of claim 8, further comprising the steps of:
determining if said Y_GT_PUT signal is 1, or if Y_LT_NUT signal is 1;
if said Y_GT_PUT signal is 1, or if Y_LT_NUT signal is 1, dividing said tracking gain error by 2.

10. An article of manufacture comprising a computer readable medium having computer readable program code disposed therein to adjust the amplitude of a signal comprising information read from an information storage medium, the computer readable program code comprising a series of computer readable program steps to effect:
forming (N) digital signals comprising information read from an information storage medium, wherein each of those (N) digital signals comprises an amplitude;
determining if a first signal comprises information read from a calibration region of said information storage medium, wherein said first signal comprises one of said (N) digital signals;
if said first signal comprises information read from a calibration region of said information storage medium, providing a first acquisition gain level and an acquisition multiplier coefficient;
calculating a gain adjusted signal comprising the multiplication product of said first signal and said first acquisition gain level;
determining an acquisition gain error;
calculating a second gain level by multiplying said acquisition multiplier coefficient times said acquisition gain error, and adding that multiplication product to said first gain level.

11. The article of manufacture of claim 10, said computer readable program code further comprising a series of computer readable program steps to effect:
providing the (i)th signal, wherein said (i)th signal comprises one of said (N) digital signals;
providing the (i+1)th signal, wherein said (i+1)th signal comprises one of said (N) digital signals;
providing the (i+2)th signal, wherein said (i+2)th signal comprises one of said (N) digital signals;
providing a target positive amplitude level;
providing a target negative amplitude;
providing said gain adjusted signal, wherein said gain adjusted signal comprises an amplitude;
determining if the amplitude of said (i+1)th signal is greater than the amplitude of said (i)th signal;
if the amplitude of said (i+1)th signal is greater than the amplitude of said (i)th signal, determining if the amplitude of said (i+1)th signal is greater than or equal to the amplitude of said (i+2)th signal;
if the amplitude of said (i+1)th signal is greater than the amplitude of said (i)th signal, and if the amplitude of said (i+1)th signal is greater than or equal to the amplitude of said (i+2)th signal, setting said acquisition gain error to equal said target positive amplitude level minus the amplitude of said gain adjusted signal.

12. The article of manufacture of claim 11, said computer readable program code further comprising a series of computer readable program steps to effect:
if the amplitude of said (i+1)th signal is not greater than the amplitude of said (i)th signal, determining if the amplitude of said (i+1)th signal is less than the amplitude of said (i)th signal;
if the amplitude of said (i+1)th signal is less than the amplitude of said (i)th signal, determining if the amplitude of said (i+1)th signal is less than or equal to the amplitude of said (i+2)th signal;
if the amplitude of said (i+1)th signal is less than the amplitude of said (i)th signal, and if the amplitude of said (i+1)th signal is less than or equal to the amplitude of said (i+2)th signal, setting said acquisition gain error to equal the amplitude of said gain adjusted signal minus said target negative amplitude.

13. The article of manufacture of claim 10, said computer readable program code further comprising a series of computer readable program steps to effect:
if said first signal does not comprise information read from a calibration region of said information storage medium, providing a first gain level and a tracking multiplier coefficient;
calculating a gain adjusted signal comprising the multiplication product of said first signal and said first gain level;
determining a tracking gain error;
calculating a second gain level by multiplying said tracking multiplier coefficient times said tracking gain error, and adding that multiplication product to said first gain level.

14. The article of manufacture of claim 13, said computer readable program code further comprising a series of computer readable program steps to effect:
providing said gain adjusted signal, wherein said gain adjusted signal comprises an amplitude;
providing a first positive level slice, a second positive level slice, a first target positive amplitude level, and a second target positive amplitude level;
determining if the amplitude of said gain adjusted signal is greater than said second positive level slice;
if the amplitude of said gain adjusted signal is greater than said second positive level slice, setting said tracking gain error equal to said second target positive amplitude level minus the amplitude of said gain adjusted signal;
if the amplitude of said gain adjusted signal is greater than said second positive level slice providing a Y_GT_PUT signal having a value of 1.

15. The article of manufacture of claim 14, said computer readable program code further comprising a series of computer readable program steps to effect:
if the amplitude of said gain adjusted signal is not greater than said second positive level slice, determining if the amplitude of said gain adjusted signal is greater than said first positive level slice;
if the amplitude of said gain adjusted signal is not greater than said second positive level slice, and if the amplitude of said gain adjusted signal is greater than said first positive level slice, setting said tracking gain error equal to said first target positive amplitude level minus the amplitude of said gain adjusted signal;
if the amplitude of said gain adjusted signal is not greater than said second positive level slice, and if the amplitude of said gain adjusted signal is greater than said first positive level slice, providing a Y_GT_PLT signal having a value of 1.

16. The article of manufacture of claim 15, said computer readable program code further comprising a series of computer readable program steps to effect:
if the amplitude of said gain adjusted signal is not greater than said first positive level slice:
providing a first negative level slice;
providing a second negative level slice;
providing a first target negative amplitude;
providing a second target negative amplitude;
determining if the amplitude of said gain adjusted signal is less than said second negative level slice;
if the amplitude of said gain adjusted signal is less than said second negative level slice, setting said tracking gain error equal to the amplitude of said gain adjusted signal minus said second target negative amplitude;
if the amplitude of said gain adjusted signal is less than said second negative level slice, providing a Y_LT_NLT signal having a value of 1.

17. The article of manufacture of claim 16, said computer readable program code further comprising a series of computer readable program steps to effect:
if the amplitude of said gain adjusted signal is not greater than said first positive level slice, and if the amplitude of said gain adjusted signal is not less than said second negative level slice, determining if the amplitude of said gain adjusted signal is less than said first negative level slice;
if the amplitude of said gain adjusted signal is not less than said second negative level slice, and if the amplitude of said gain adjusted signal is less than said first negative level slice, setting said tracking gain error equal to the amplitude of said gain adjusted signal minus said first target negative amplitude;
if the amplitude of said gain adjusted signal is not less than said second negative level slice, and if the amplitude of said gain adjusted signal is less than said first negative level slice, providing a Y_LT_NLT signal having a value of 1.

18. The article of manufacture of claim 8, said computer readable program code further comprising a series of computer readable program steps to effect:
determining if said Y_GT_PUT signal is 1, or if Y_LT_NUT signal is 1;
if said Y_GT_PUT signal is 1, or if Y_LT_NUT signal is 1, dividing said tracking gain error by 2.

19. A computer program product embodied in a data storage medium, said computer program product being usable with a programmable computer processor to adjust the amplitude of a signal comprising information read from an information storage medium, comprising:
computer readable program code which causes said programmable computer processor to form (N) digital signals comprising information read from an information storage medium, wherein each of those (N) digital signals comprises an amplitude;
computer readable program code which causes said programmable computer processor to determine if a first signal comprises information read from a calibration region of said information storage medium, wherein said first signal comprises one of said (N) digital signals;

computer readable program code which, if said first signal comprises information read from a calibration region of said information storage medium, causes said programmable computer processor to receive a first acquisition gain level and an acquisition multiplier coefficient;

computer readable program code which causes said programmable computer processor to calculate a gain adjusted signal comprising the multiplication product of said first signal and said first acquisition gain level;

computer readable program code which causes said programmable computer processor to calculate an acquisition gain error;

computer readable program code which causes said programmable computer processor to calculate a second gain level by multiplying said acquisition multiplier coefficient times said acquisition gain error, and adding that multiplication product to said first gain level.

20. The computer program product of claim 19, further comprising:

computer readable program code which causes said programmable computer processor to receive the (i)th signal, wherein said (i)th signal comprises one of said (N) digital signals;

computer readable program code which causes said programmable computer processor to receive the (i+1)th signal wherein said (i+1)th signal comprises one of said (N) digital signals;

computer readable program code which causes said programmable computer processor to receive the (i+2)th signal, wherein said (i+2)th signal comprises one of said (N) digital signals;

computer readable program code which causes said programmable computer processor to receive a target positive amplitude level;

computer readable program code which causes said programmable computer processor to receive a target negative amplitude;

computer readable program code which causes said programmable computer processor to receive said gain adjusted signal, wherein said gain adjusted signal comprises an amplitude;

computer readable program code which causes said programmable computer processor to determine if the amplitude of said (i+1)th signal is greater than the amplitude of said (i)th signal;

computer readable program code which, if the amplitude of said (i+1)th signal is greater than the amplitude of said (i)th signal, causes said programmable computer processor to determine if the amplitude of said (i+1)th signal is greater than or equal to the amplitude of said (i+2)th signal;

computer readable program code which, if the amplitude of said (i+1)th signal is greater than the amplitude of said (i)th signal and if the amplitude of said (i+1)th signal is greater than or equal to the amplitude of said (i+2)th signal, causes said programmable computer processor to set said acquisition gain error to equal said target positive amplitude level minus the amplitude of said gain adjusted signal.

21. The computer program product of claim 20, further comprising:

computer readable program code which, if the amplitude of said (i+1)th signal is not greater than the amplitude of said (i)th signal, causes said programmable computer processor to determining if the amplitude of said (i+1)th signal is less than the amplitude of said (i)th signal;

computer readable program code which, if the amplitude of said (i+1)th signal is less than the amplitude of said (i)th signal, causes said programmable computer processor to determine if the amplitude of said (i+1)th signal is less than or equal to the amplitude of said (i+2)th signal;

computer readable program code which, if the amplitude of said (i+1)th signal is less than the amplitude of said (i)th signal, and if the amplitude of said (i+1)th signal is less than or equal to the amplitude of said (i+2)th signal, causes said programmable computer processor to set said acquisition gain error to equal the amplitude of said gain adjusted signal minus said target negative amplitude.

22. The computer program product of claim 19, further comprising:

computer readable program code which, if said first signal does not comprise information read from a calibration region of said information storage medium, causes said programmable computer processor to receive a first gain level and a tracking multiplier coefficient;

computer readable program code which causes said programmable computer processor to calculate a gain adjusted signal comprising the multiplication product of said first signal and said first gain level, wherein said gain adjusted signal comprises an amplitude;

computer readable program code which causes said programmable computer processor to calculate a tracking gain error;

computer readable program code which causes said programmable computer processor to calculate a second gain level by multiplying said tracking multiplier coefficient times said tracking gain error, and to add that multiplication product to said first gain level.

23. The computer program product of claim 22, further comprising:

computer readable program code which causes said programmable computer processor to retrieve a first positive level slice, a second positive level slice, a first target positive amplitude level, and a second target positive amplitude level;

computer readable program code which causes said programmable computer processor to determine if the amplitude of said gain adjusted signal is greater than said second positive level slice;

computer readable program code which, if the amplitude of said gain adjusted signal is greater than said second positive level slice, causes said programmable computer processor to set said tracking gain error equal to said second target positive amplitude level minus the amplitude of said gain adjusted signal;

computer readable program code which, if the amplitude of said gain adjusted signal is greater than said second positive level slice, causes said programmable computer processor to provide a Y_GT_PUT signal having a value of 1.

24. The computer program product of claim 23, further comprising:

computer readable program code which, if the amplitude of said gain adjusted signal is not greater than said second positive level slice, causes said programmable computer processor to determine if the amplitude of said gain adjusted signal is greater than said first positive level slice;

computer readable program code which, if the amplitude of said gain adjusted signal is not greater than said second positive level slice and if the amplitude of said gain adjusted signal is greater than said first positive level slice, causes said programmable computer processor to set said tracking gain error equal to said first target positive amplitude level minus the amplitude of said gain adjusted signal;

computer readable program code which, if the amplitude of said gain adjusted signal is not greater than said second positive level slice, and if the amplitude of said gain adjusted signal is greater than said first positive level slice, causes said programmable computer processor to provide a Y_GT_PLT signal having a value of 1.

25. The computer program product of claim 24, further comprising:

computer readable program code which, if the amplitude of said gain adjusted signal is not greater than said first positive level slice, causes said programmable computer processor to retrieve a first negative level slice, a second negative level slice, a first target negative amplitude, and a second target negative amplitude;

computer readable program code which causes said programmable computer processor to determine if the amplitude of said gain adjusted signal is less than said second negative level slice;

computer readable program code which, if the amplitude of said gain adjusted signal is less than said second negative level slice, causes said programmable computer processor to set said tracking gain error equal to the amplitude of said gain adjusted signal minus said first second negative amplitude;

computer readable program code which, if the amplitude of said gain adjusted signal is less than said second negative level slice, causes said programmable computer processor to provide a Y_LT_NLT signal having a value of 1.

26. The computer program product of claim 25, further comprising:

computer readable program code which, if the amplitude of said gain adjusted signal is not greater than said first positive level slice and if the amplitude of said gain adjusted signal is not less than said second negative level slice, causes said programmable computer processor to determine if the amplitude of said gain adjusted signal is less than said first negative level slice;

computer readable program code which, if the amplitude of said gain adjusted signal is not less than said second negative level slice and if the amplitude of said gain adjusted signal is less than said first negative level slice, causes said programmable computer processor to set said tracking gain error equal to the amplitude of said gain adjusted signal minus said first target negative amplitude;

computer readable program code which, if the amplitude of said gain adjusted signal is not less than said second negative level slice, and if the amplitude of said gain adjusted signal is less than said first negative level slice, causes said programmable computer processor to provide a Y_LT_NLT signal having a value of 1.

27. The computer program product of claim 26, further comprising:

computer readable program code which causes said programmable computer processor to determine if said Y_GT_PUT signal is 1 or if Y_LT_NUT signal is 1;

computer readable program code which, if said Y_GT_PUT signal is 1, or if Y_LT_NUT signal is 1, causes said programmable computer processor to divide said tracking gain error by 2.

* * * * *